US012062951B2

(12) United States Patent
Son et al.

(10) Patent No.: US 12,062,951 B2
(45) Date of Patent: Aug. 13, 2024

(54) SENSING DEVICE

(71) Applicant: LG INNOTEK CO., LTD., Seoul (KR)

(72) Inventors: Ho Chan Son, Seoul (KR); Se Ho Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 179 days.

(21) Appl. No.: 17/781,878

(22) PCT Filed: Nov. 30, 2020

(86) PCT No.: PCT/KR2020/017298
§ 371 (c)(1),
(2) Date: Jun. 2, 2022

(87) PCT Pub. No.: WO2021/112514
PCT Pub. Date: Jun. 10, 2021

(65) Prior Publication Data
US 2023/0033808 A1    Feb. 2, 2023

(30) Foreign Application Priority Data

Dec. 4, 2019  (KR) .......................... 10-2019-0160089
Dec. 4, 2019  (KR) .......................... 10-2019-0160091

(51) Int. Cl.
*H02K 11/24*     (2016.01)
*B62D 6/10*      (2006.01)
(Continued)

(52) U.S. Cl.
CPC ............... *H02K 11/24* (2016.01); *B62D 6/10* (2013.01); *G01L 3/10* (2013.01); *H02K 1/16* (2013.01); *H02K 1/27* (2013.01); *H02K 2211/03* (2013.01)

(58) Field of Classification Search
CPC .. H02K 11/24; H02K 1/16; H02K 1/27; H02K 2211/03; B62D 6/10; G01L 3/10;
(Continued)

(56) References Cited

U.S. PATENT DOCUMENTS 5,932,942 A * 8/1999 Patyk ..................... H02K 11/33
310/58
10,871,411 B2 * 12/2020 Rachui .................... G01L 5/221
(Continued)

FOREIGN PATENT DOCUMENTS

JP    2015-184220    10/2015
KR    10-0976701     8/2010
(Continued)

OTHER PUBLICATIONS

International Search Report dated Feb. 24, 2021 issued in Application No. PCT/KR2020/017298.

*Primary Examiner* — Ahmed Elnakib
(74) *Attorney, Agent, or Firm* — KED & ASSOCIATES, LLP

(57) ABSTRACT

An embodiment may provide a motor comprising: a stator including stator teeth; and a rotor including a magnet, wherein the stator teeth include a first stator tooth and a second stator tooth disposed within the first stator tooth, wherein the first stator tooth includes a plurality of first teeth, the second stator tooth includes a plurality of second teeth, wherein the first teeth radially overlap the second teeth at the center of the stator in a radial direction, the motor further comprising: a sensor and a collector disposed between the first stator tooth and the second stator tooth in the radial direction, and the motor further comprising: a circuit board on which the sensor is disposed; and a housing accommodating the circuit board, wherein the collector includes a first collector and a second collector disposed within the first collector, the sensor is disposed, in the radial (Continued)

direction, between the first collector and the second collector, and the housing includes a first protrusion, wherein the first protrusion comprises: a body disposed, in the radial direction, between the first collector and the second collector; a head disposed at an upper end of the body; and a first groove, wherein the head includes a first surface and a second surface disposed so as to face each other, wherein the first surface is in contact with an upper end of the first collector and an upper end of the second collector, the first groove is disposed so as to be concave on the second surface, and a portion of the first groove is disposed to overlap the first and second collectors in the radial direction.

10 Claims, 41 Drawing Sheets

(51) Int. Cl.
    *G01L 3/10*         (2006.01)
    *H02K 1/16*         (2006.01)
    *H02K 1/27*         (2022.01)

(58) Field of Classification Search
    CPC ........... G01L 3/104; G01L 5/221; G01D 5/14; G01M 17/06
    USPC ...................................................... 310/68 B
    See application file for complete search history.

(56) References Cited

U.S. PATENT DOCUMENTS

| | | | |
|---|---|---|---|
| 2009/0027045 A1 | 1/2009 | Islam et al. | |
| 2010/0244606 A1* | 9/2010 | Kim | H02K 15/03 29/598 |
| 2010/0319466 A1* | 12/2010 | Bae | G01L 3/104 73/862.325 |
| 2012/0312088 A1* | 12/2012 | Kang | B62D 15/0215 73/117.02 |
| 2016/0238471 A1* | 8/2016 | Son | G01L 3/101 |
| 2020/0348196 A1* | 11/2020 | Son | G01D 11/16 |
| 2021/0080288 A1* | 3/2021 | Lee | B62D 6/10 |
| 2021/0175760 A1* | 6/2021 | Woo | H02K 1/185 |
| 2021/0239551 A1* | 8/2021 | Yang | G01B 7/30 |
| 2021/0247252 A1* | 8/2021 | Byun | B62D 6/10 |
| 2022/0214236 A1* | 7/2022 | Byun | B62D 15/0215 |

FOREIGN PATENT DOCUMENTS

| | | |
|---|---|---|
| KR | 10-1233888 | 2/2013 |
| KR | 10-2019-0028123 | 3/2019 |

* cited by examiner

【FIG. 1】
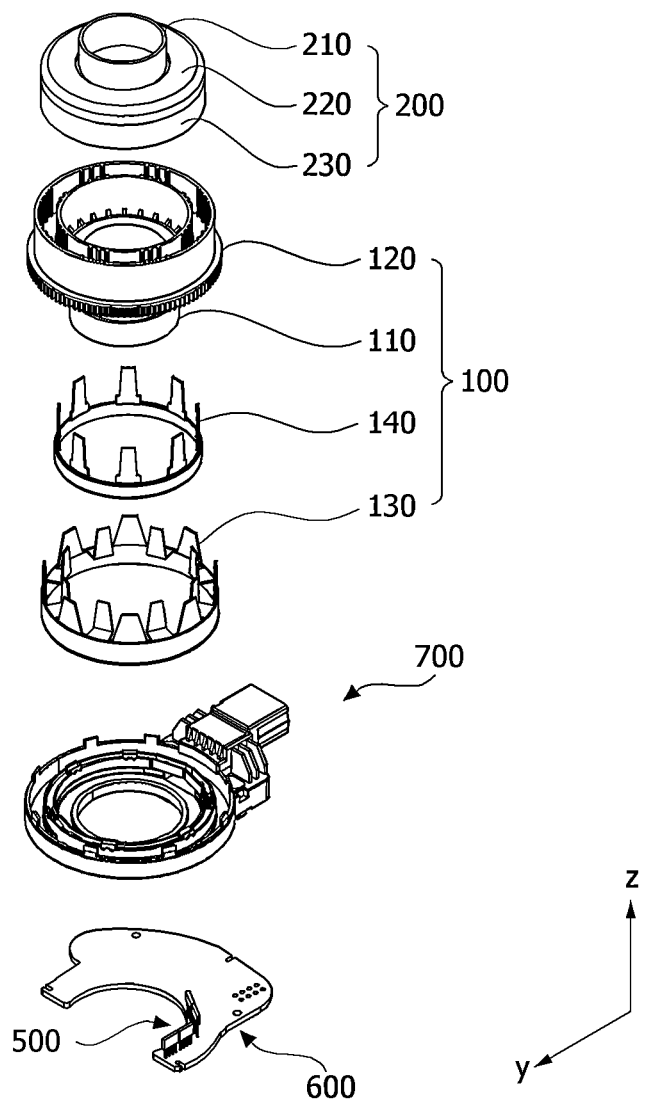

[FIG. 2]
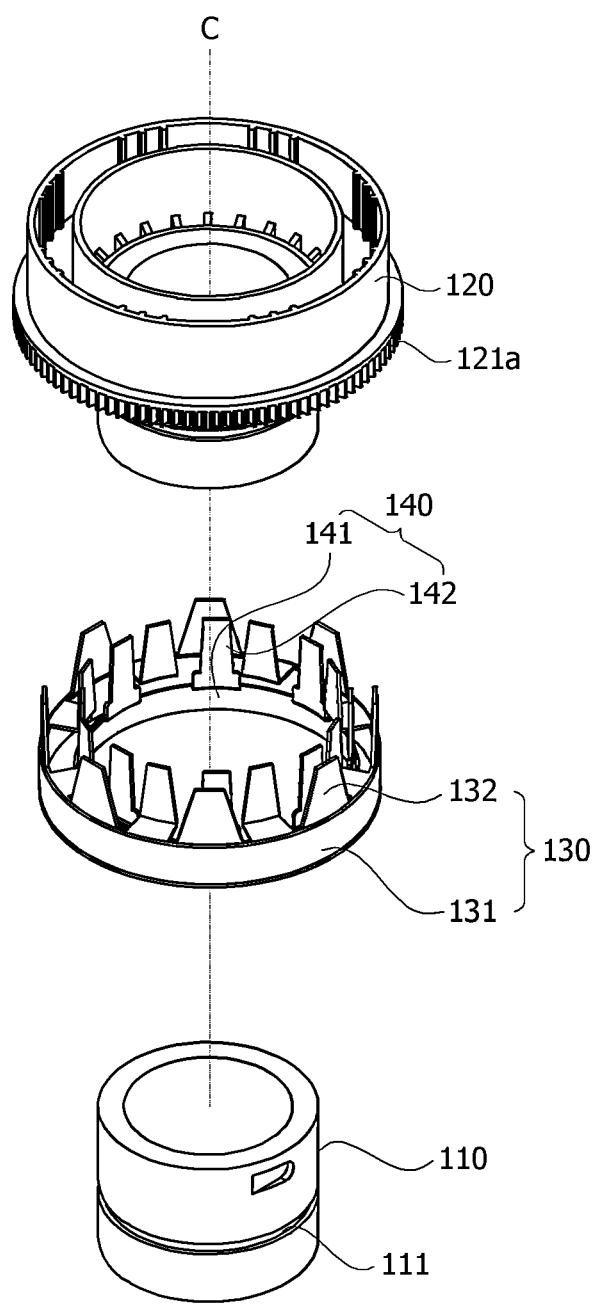

[FIG. 3]
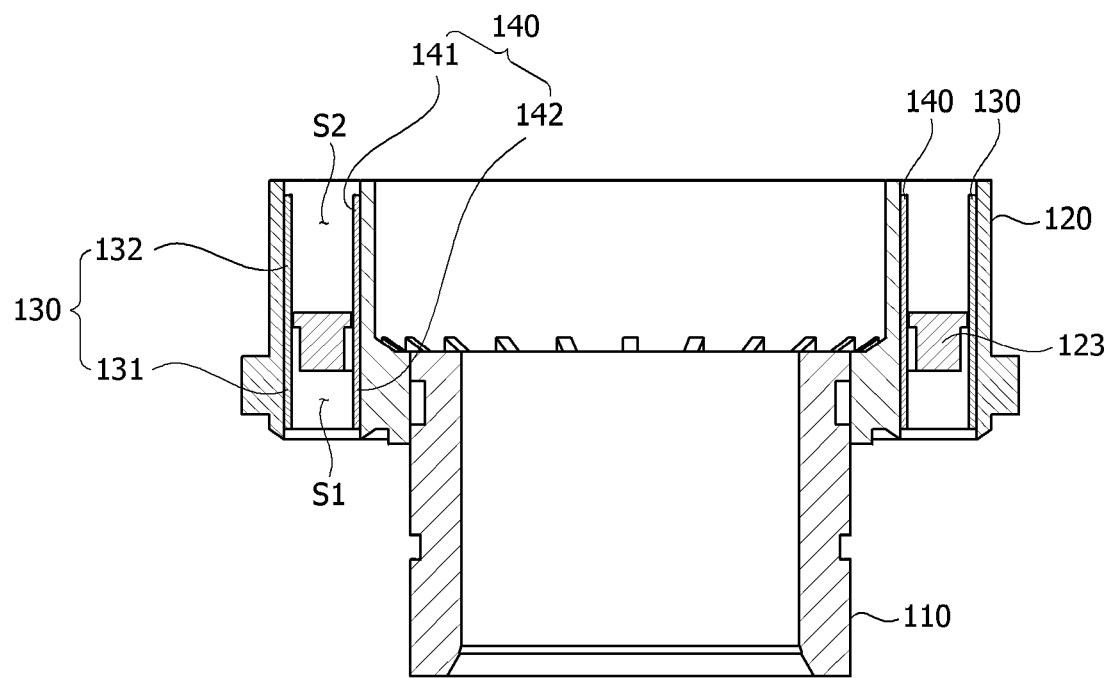

[FIG. 4]
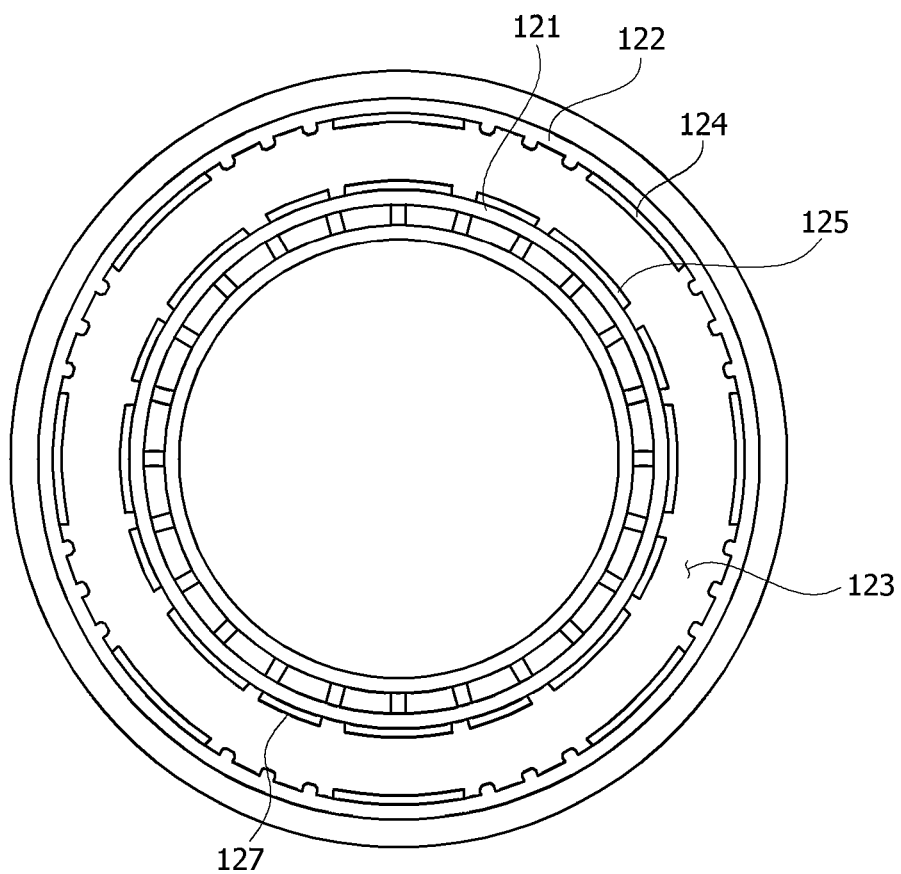

[FIG. 5]
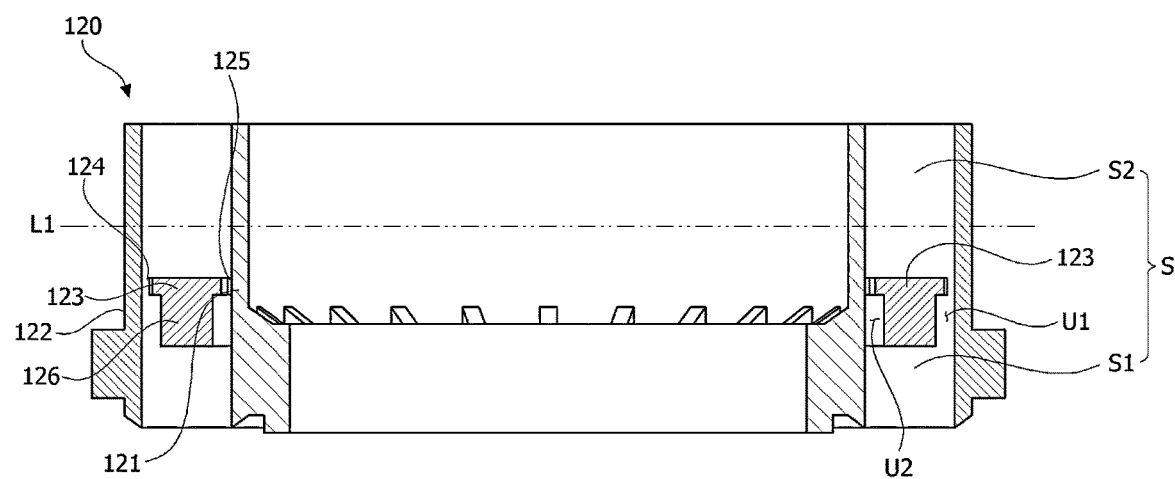

[FIG. 6]
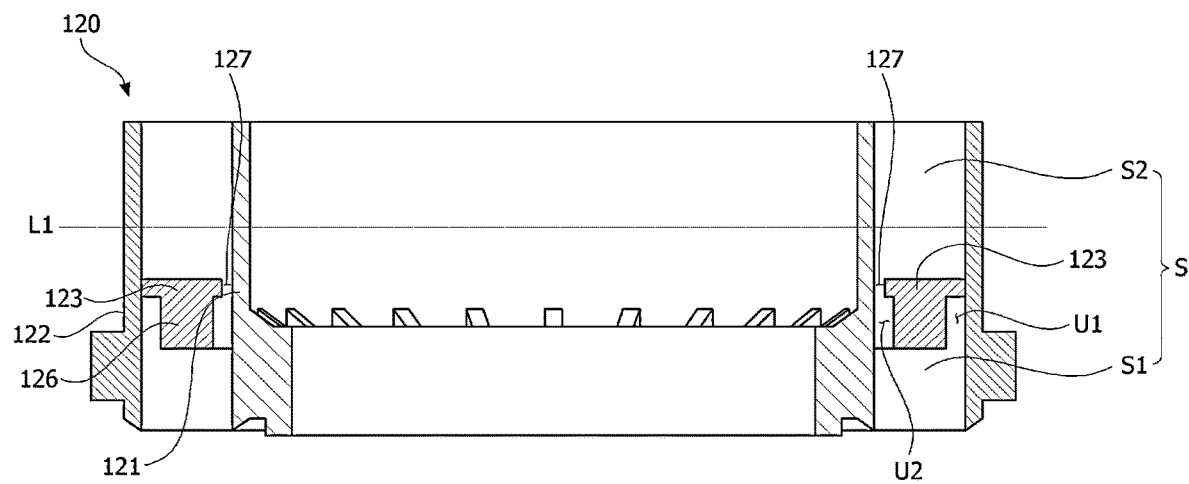

[Fig.7]
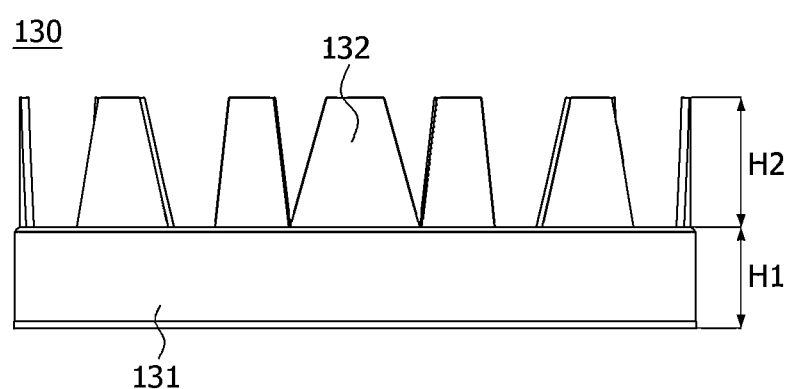

【FIG. 8】
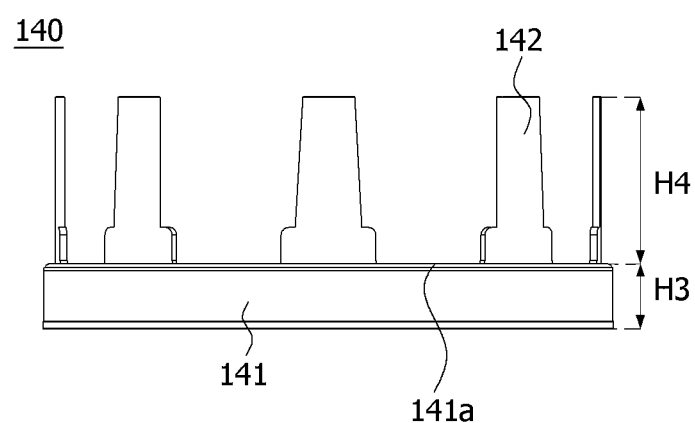

[FIG. 9]
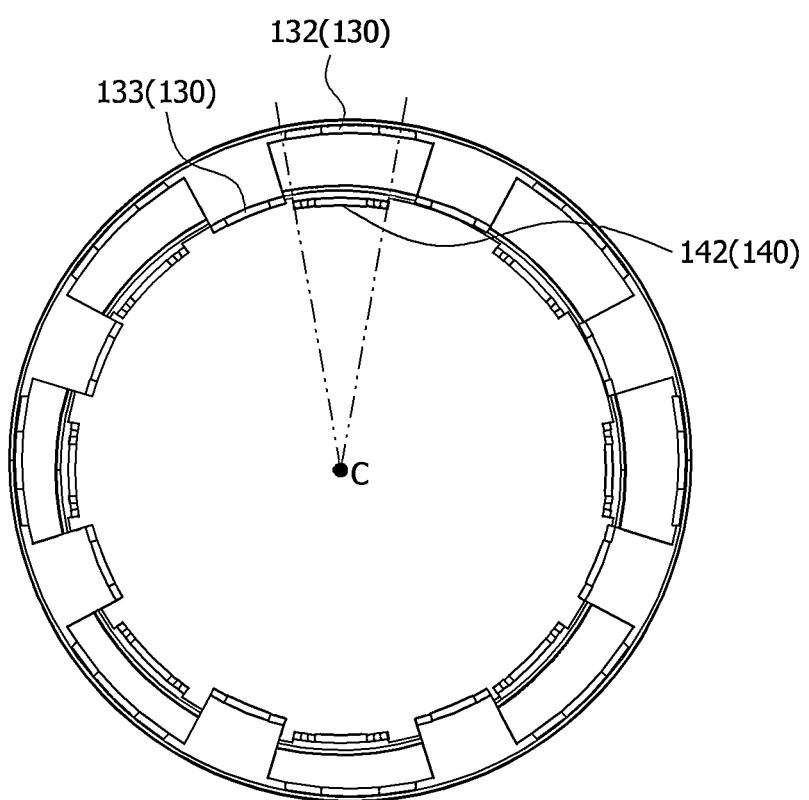

[FIG. 10]
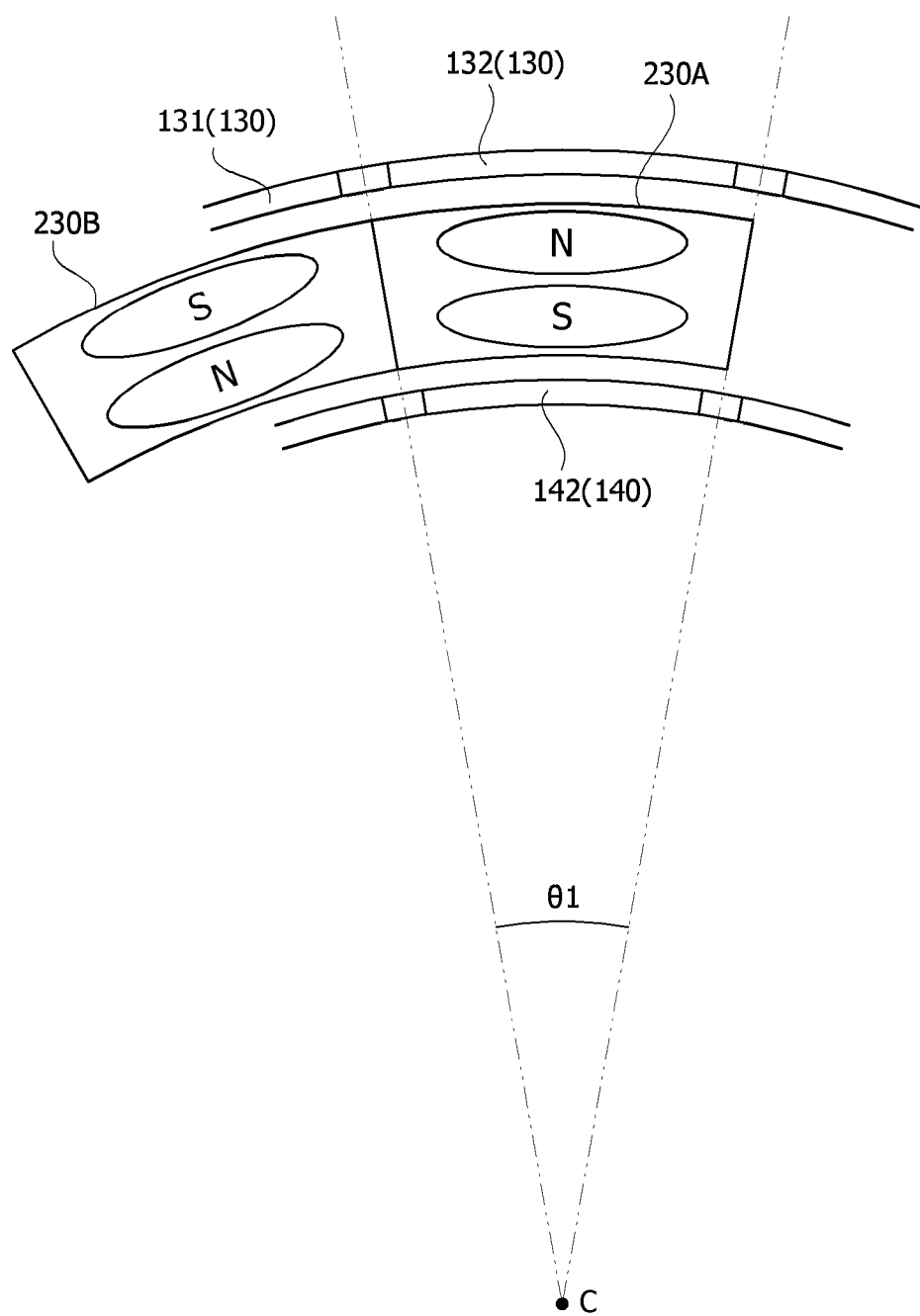

[FIG. 11]
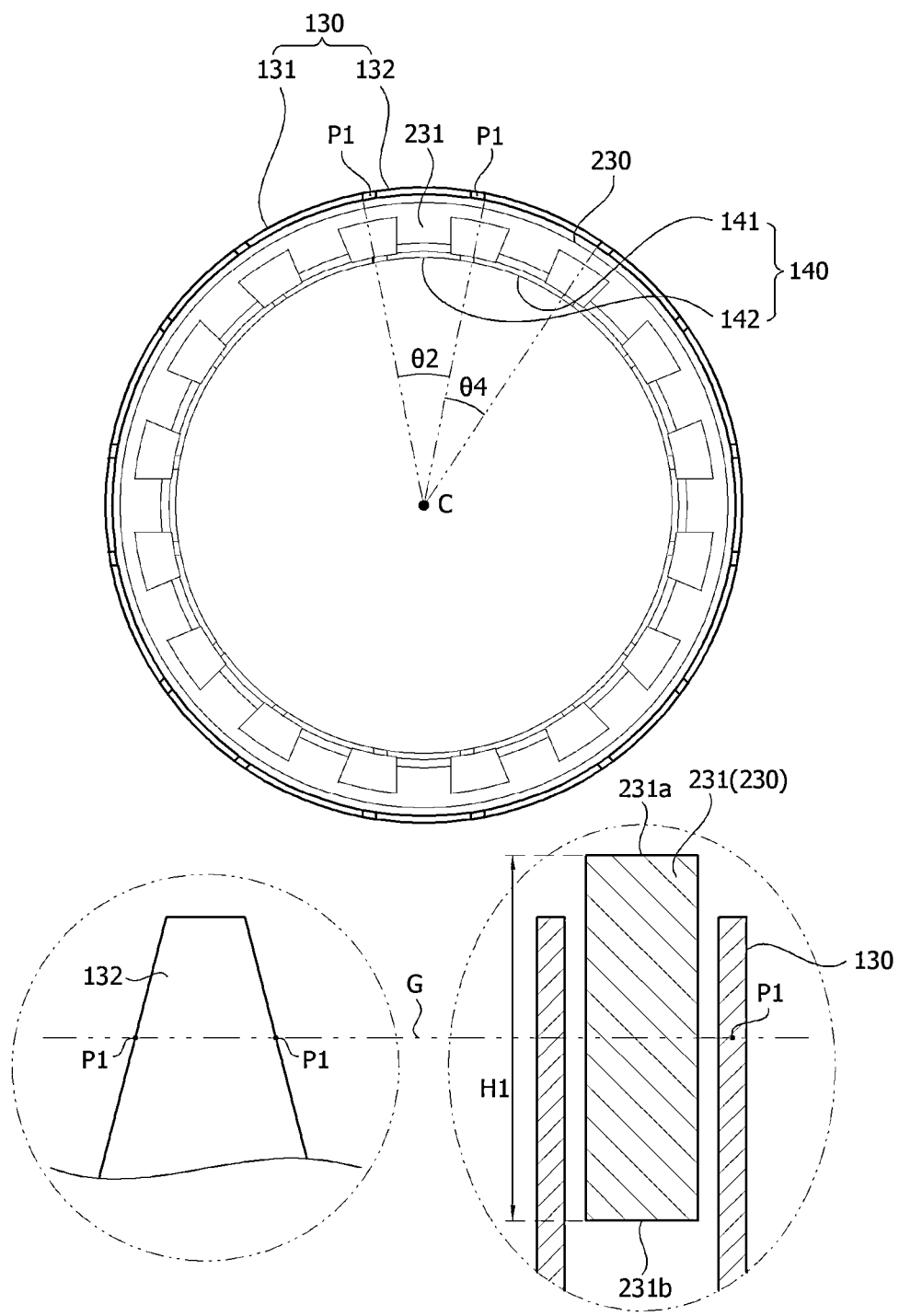

[FIG. 12]
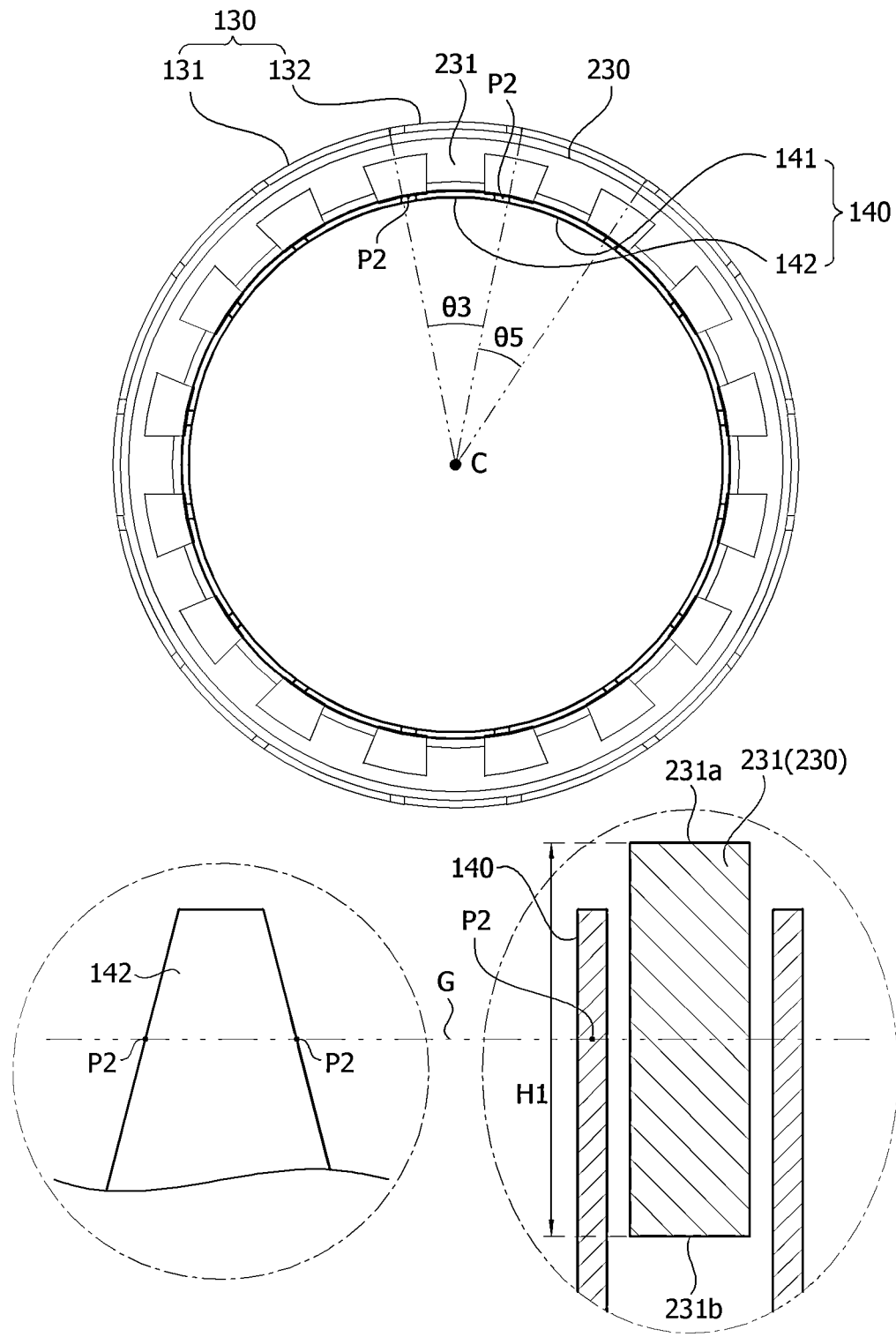

[FIG. 13]
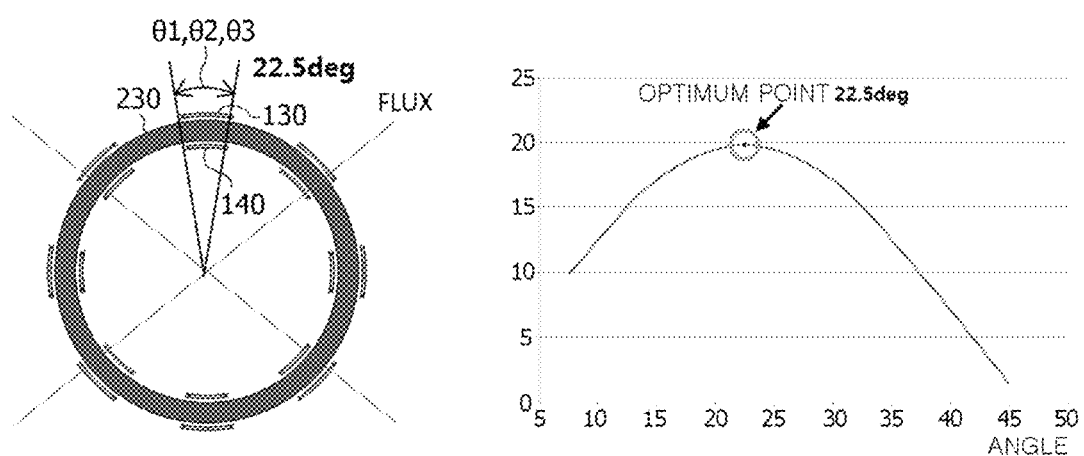

[FIG. 14]
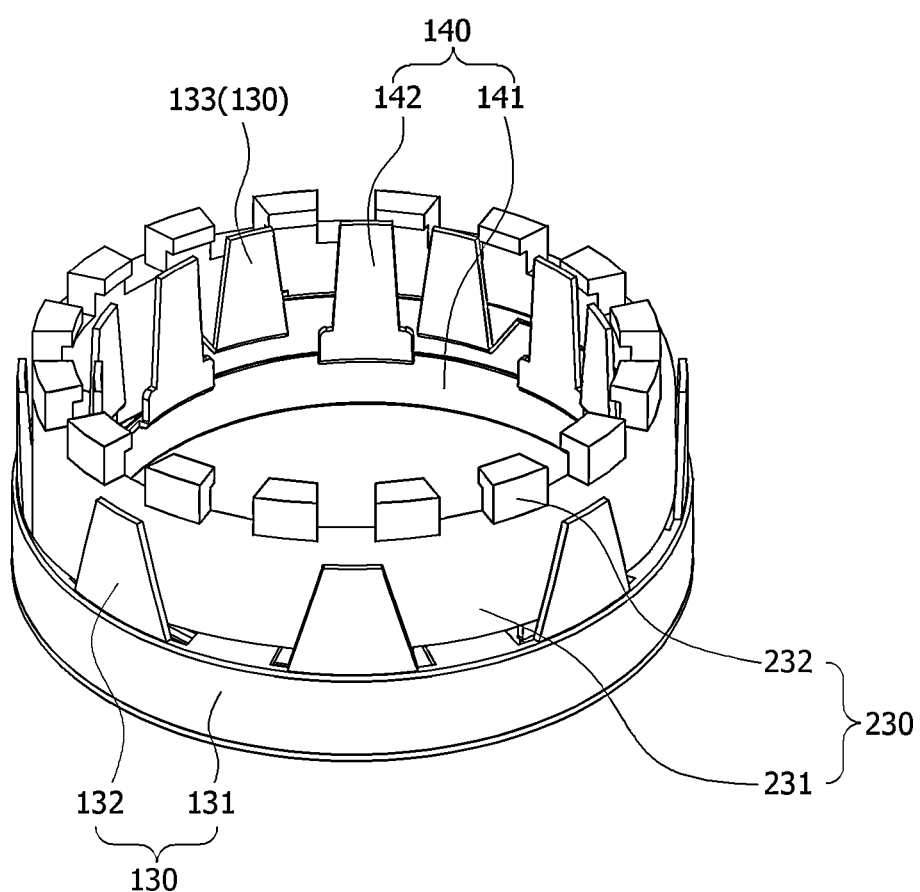

[FIG. 15]
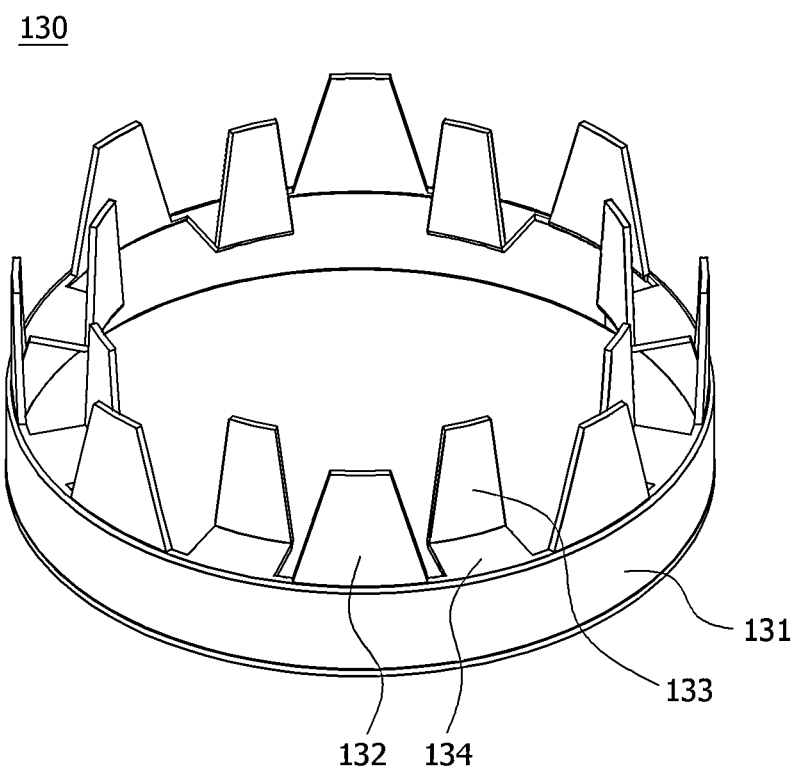

【FIG. 16】
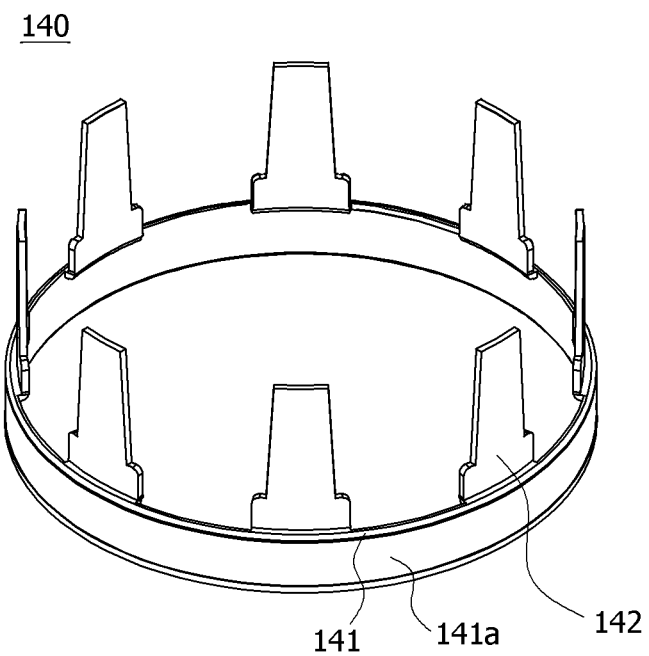

[FIG. 17]
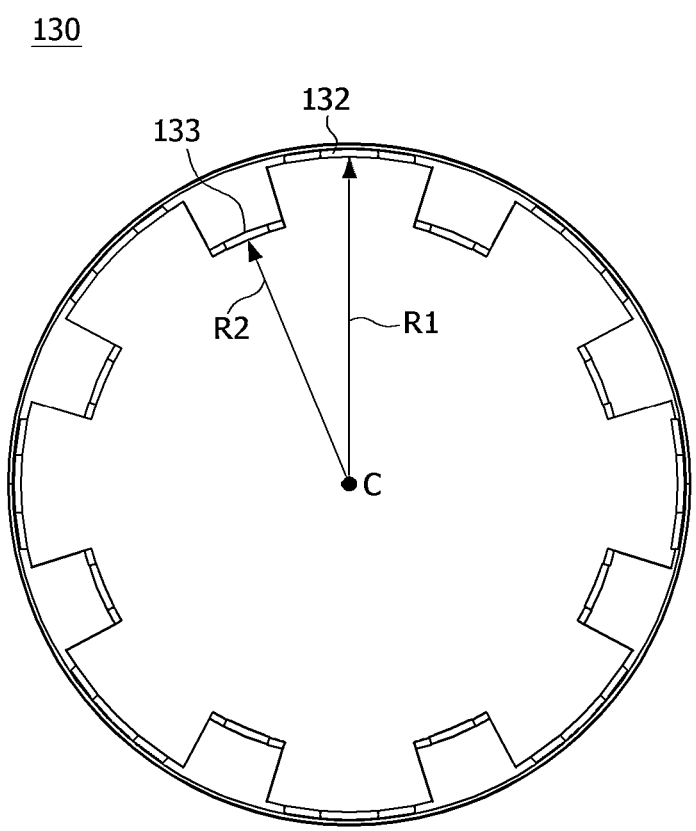

[FIG. 18]
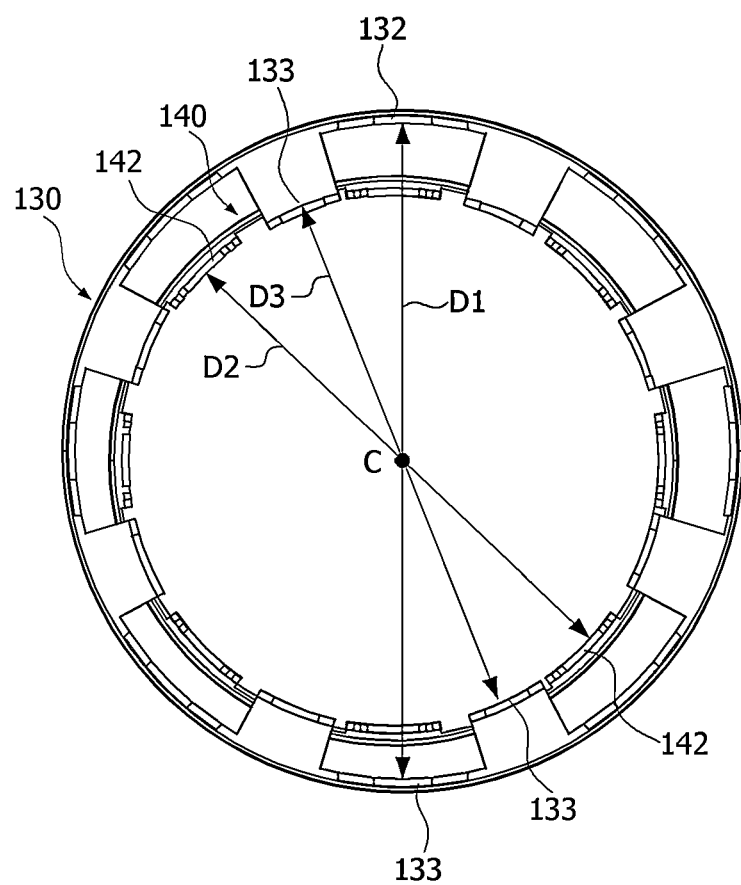

[FIG. 19]
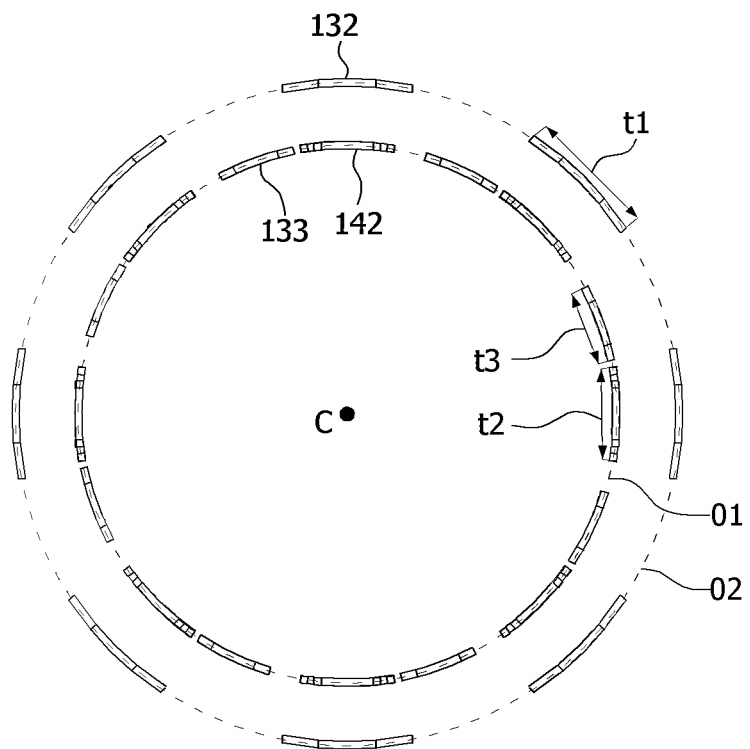

[FIG. 20]
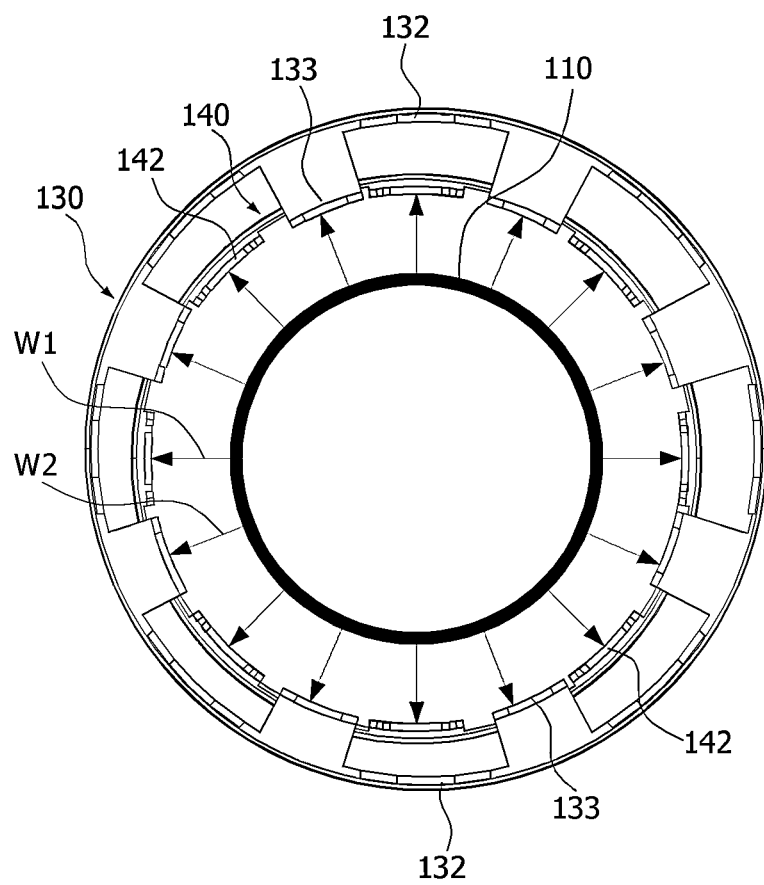

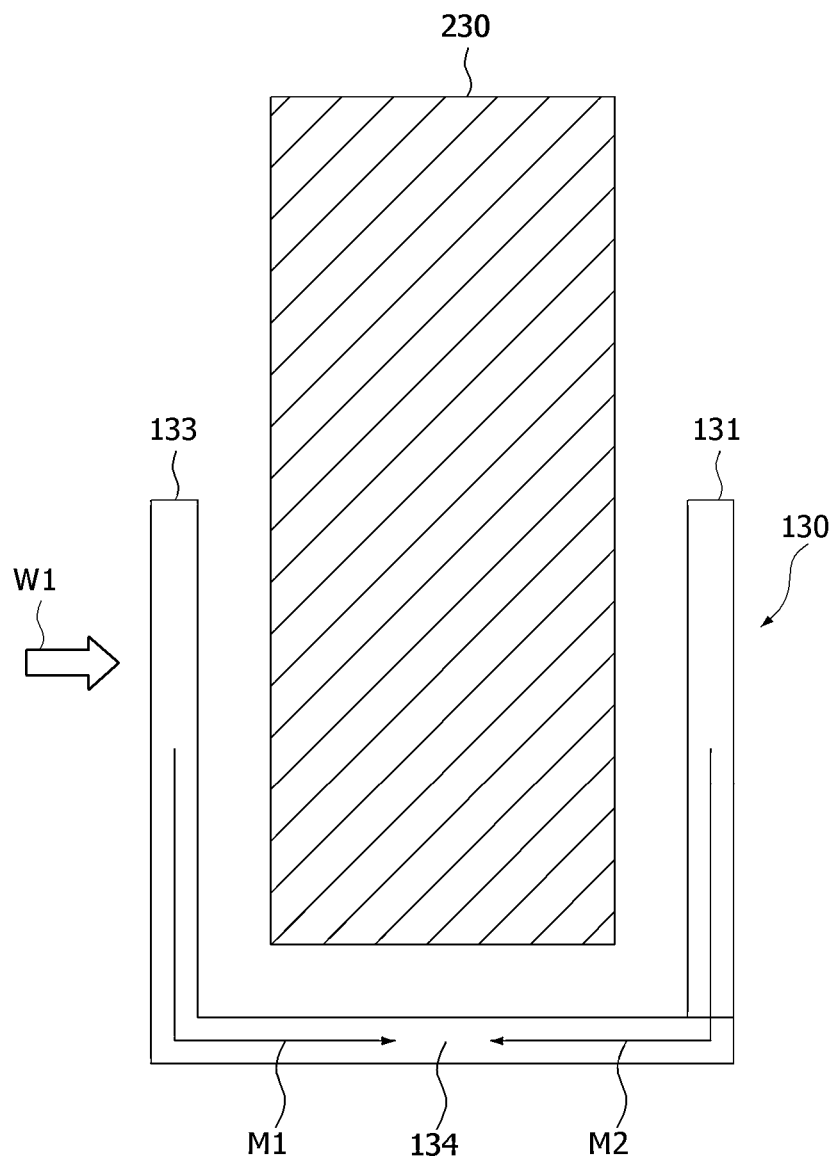
[FIG. 21]

[FIG. 22]
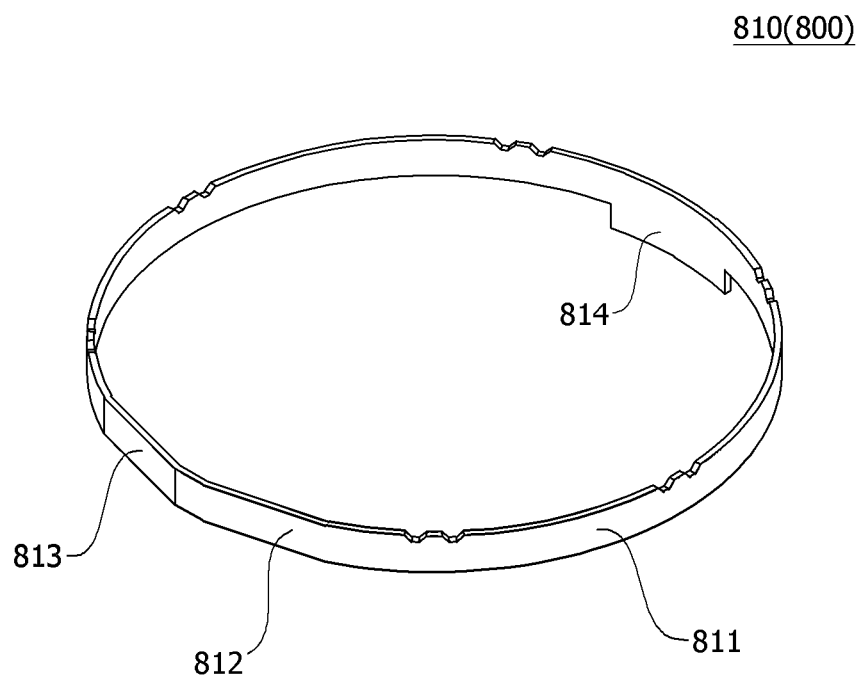

[FIG. 23]
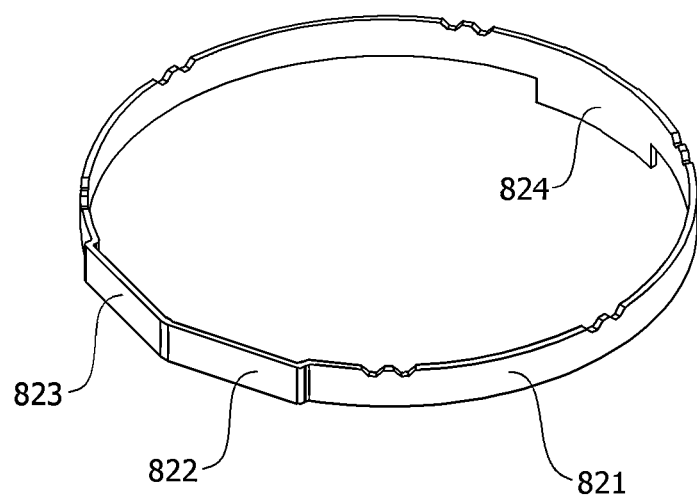

[FIG. 24]
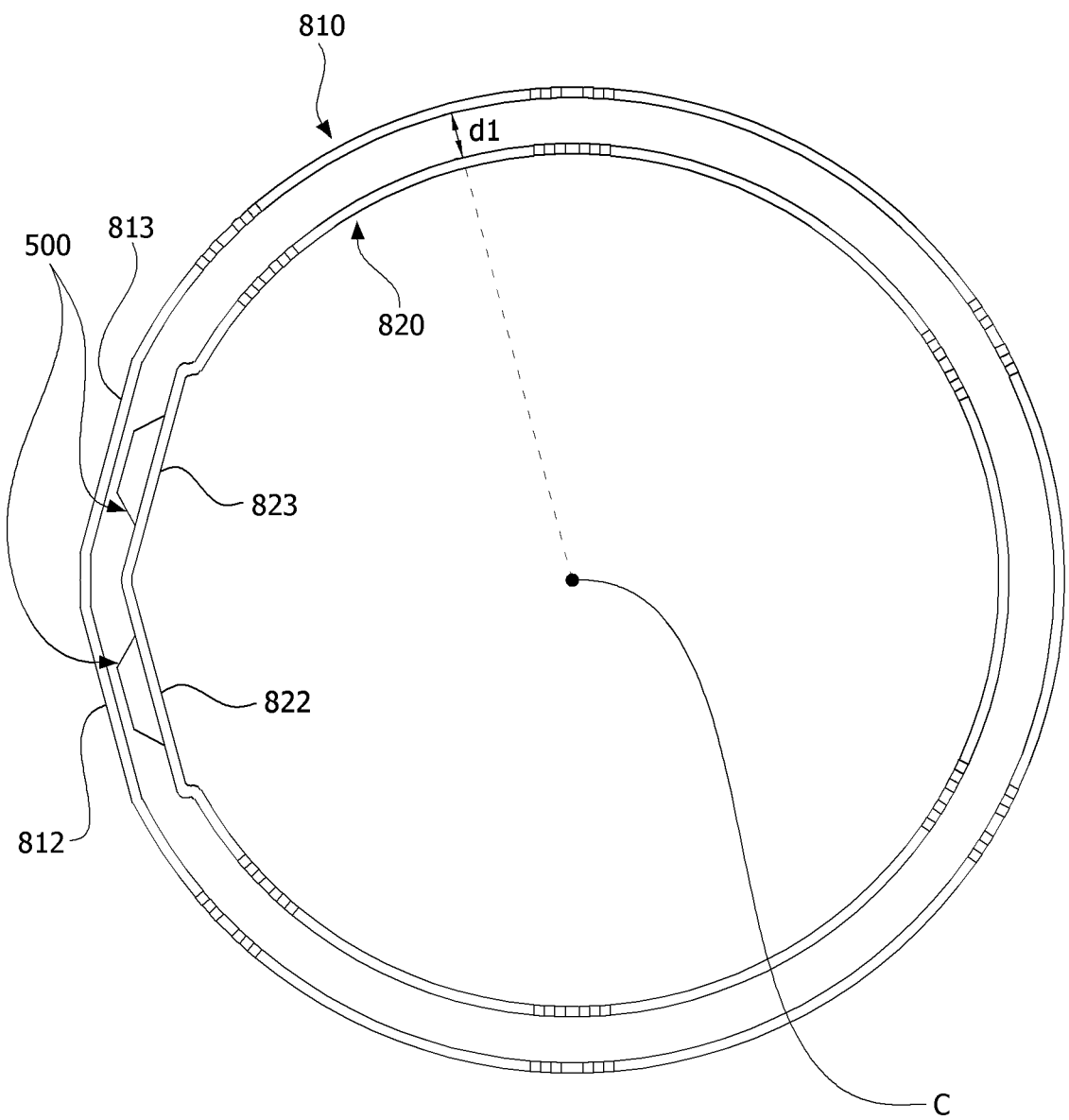

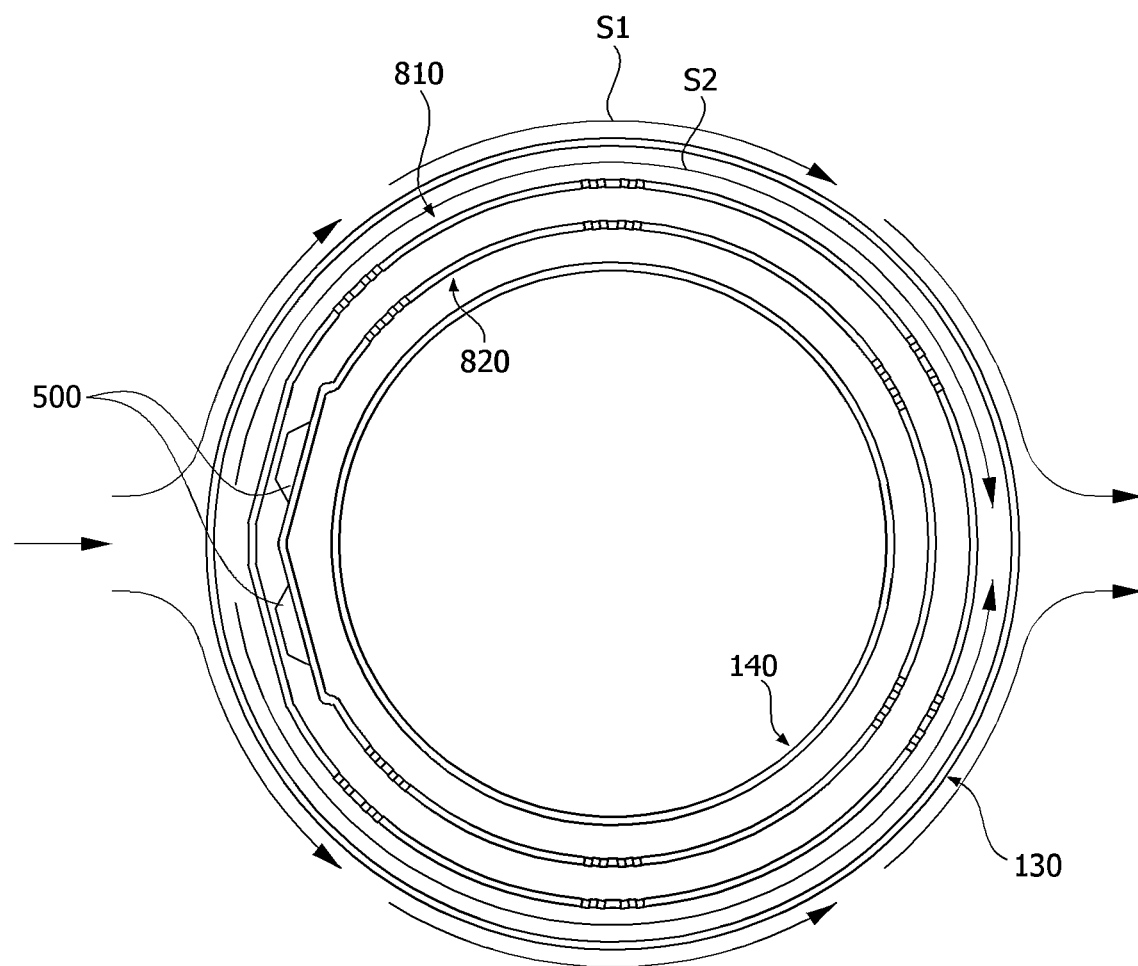
[FIG. 25]

【FIG. 26】
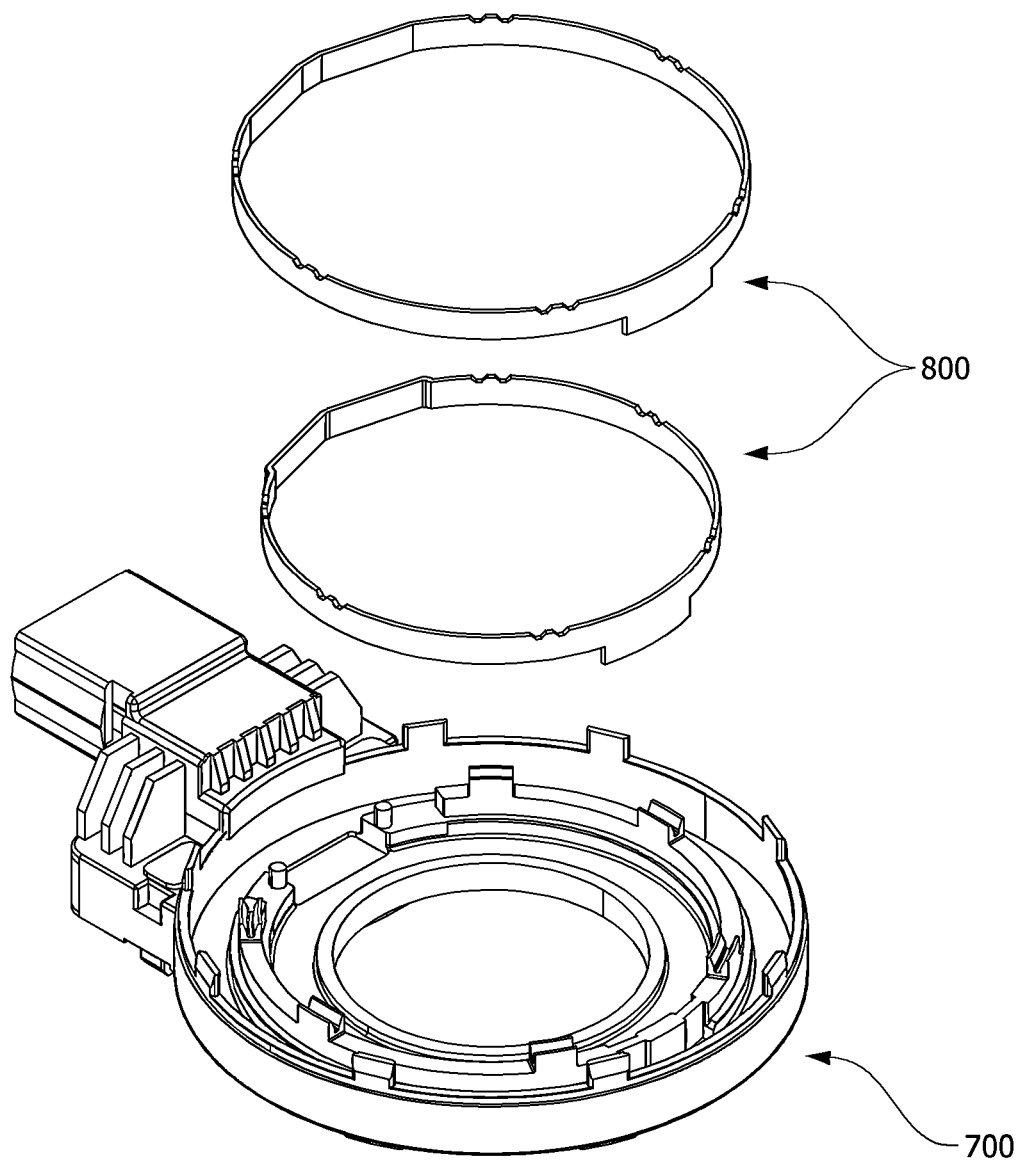

[FIG. 27]
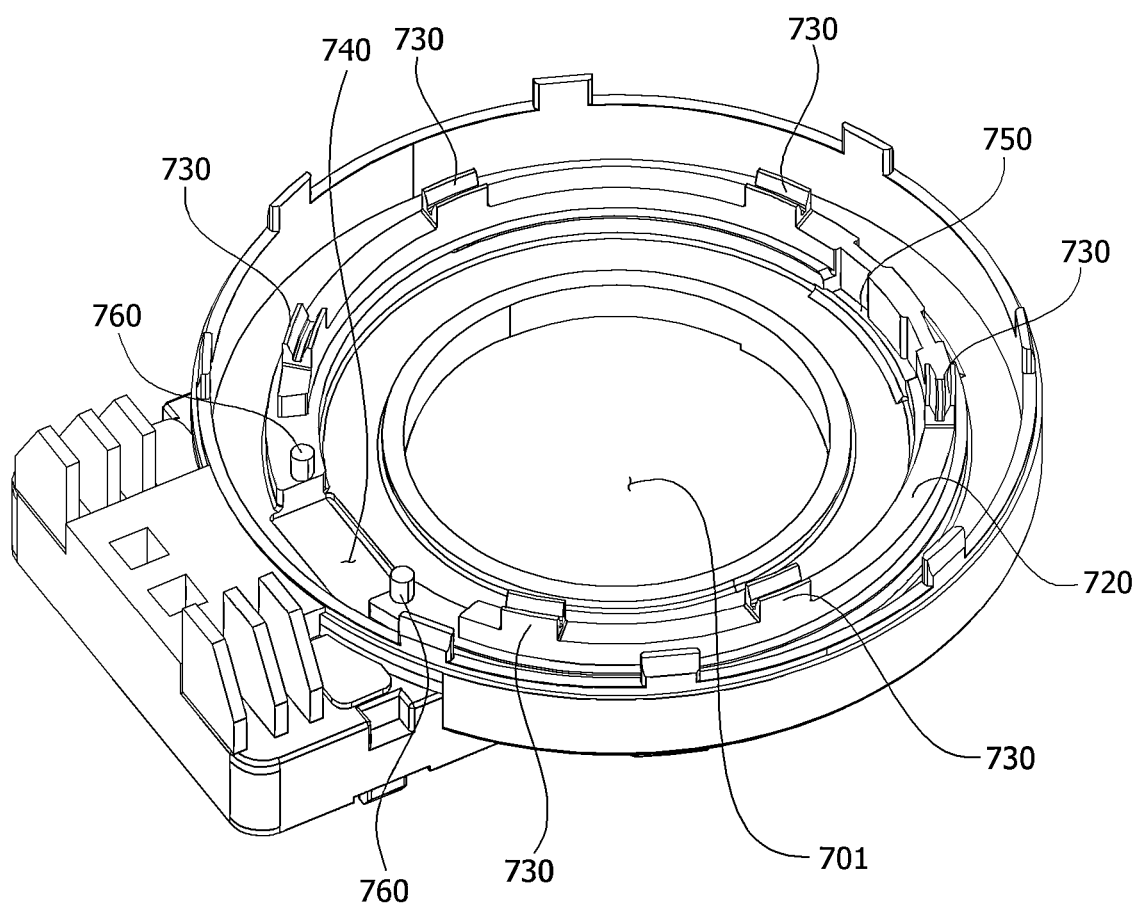

[FIG. 28]
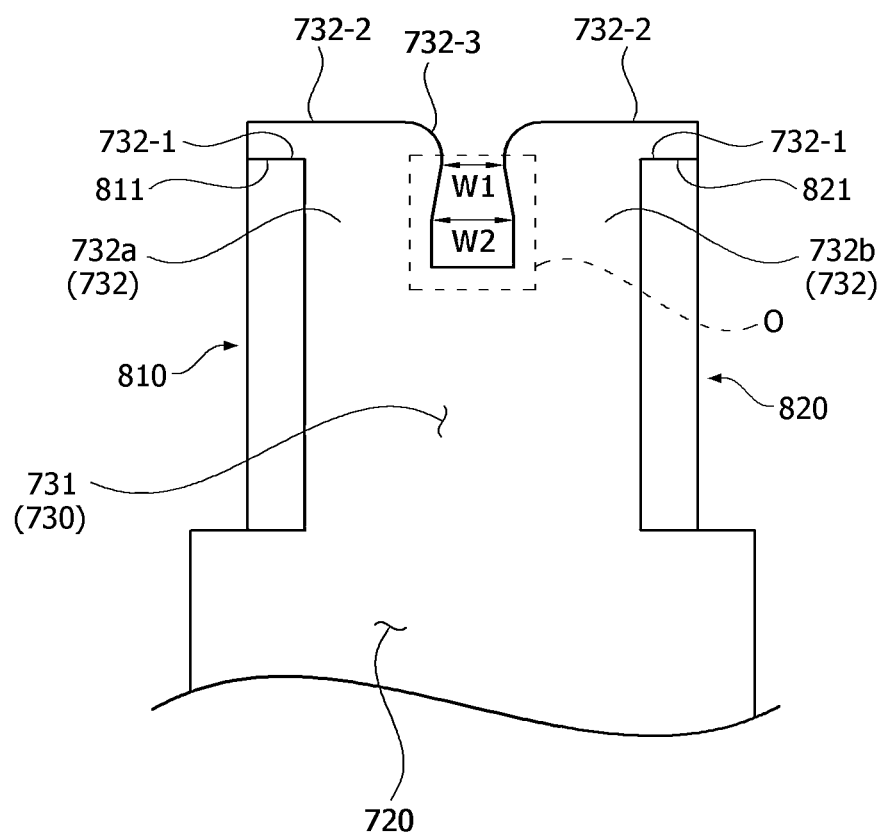

[FIG. 29]
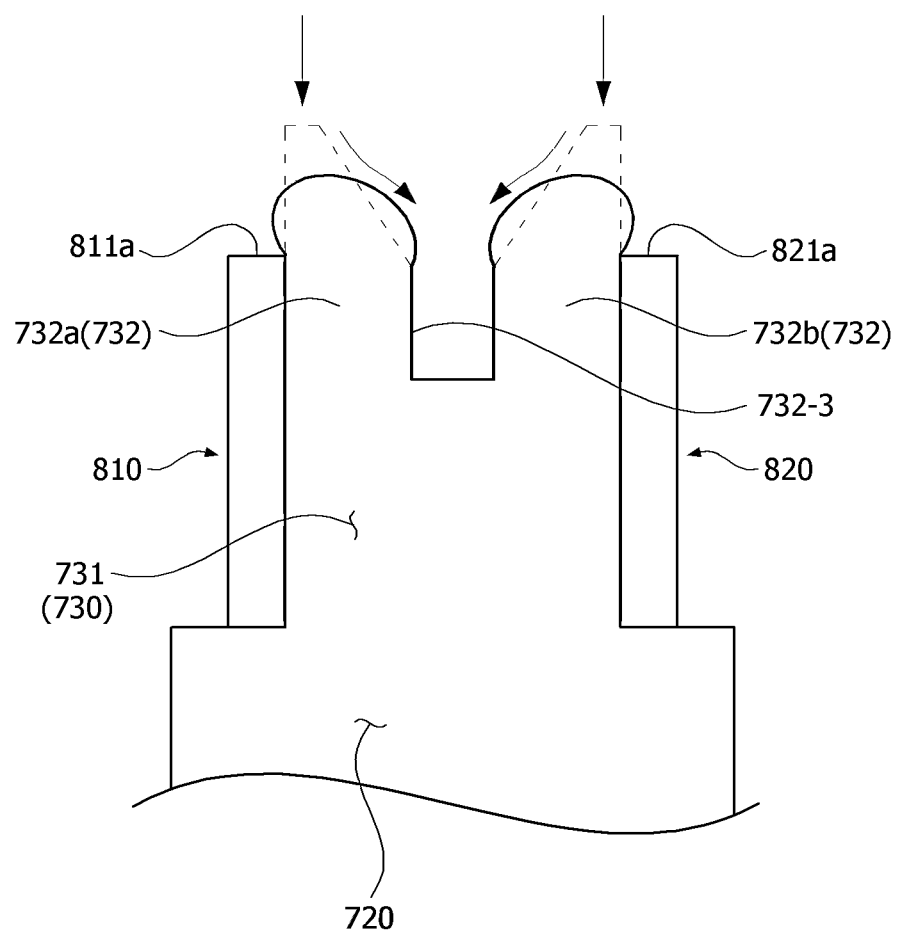

[FIG. 30]
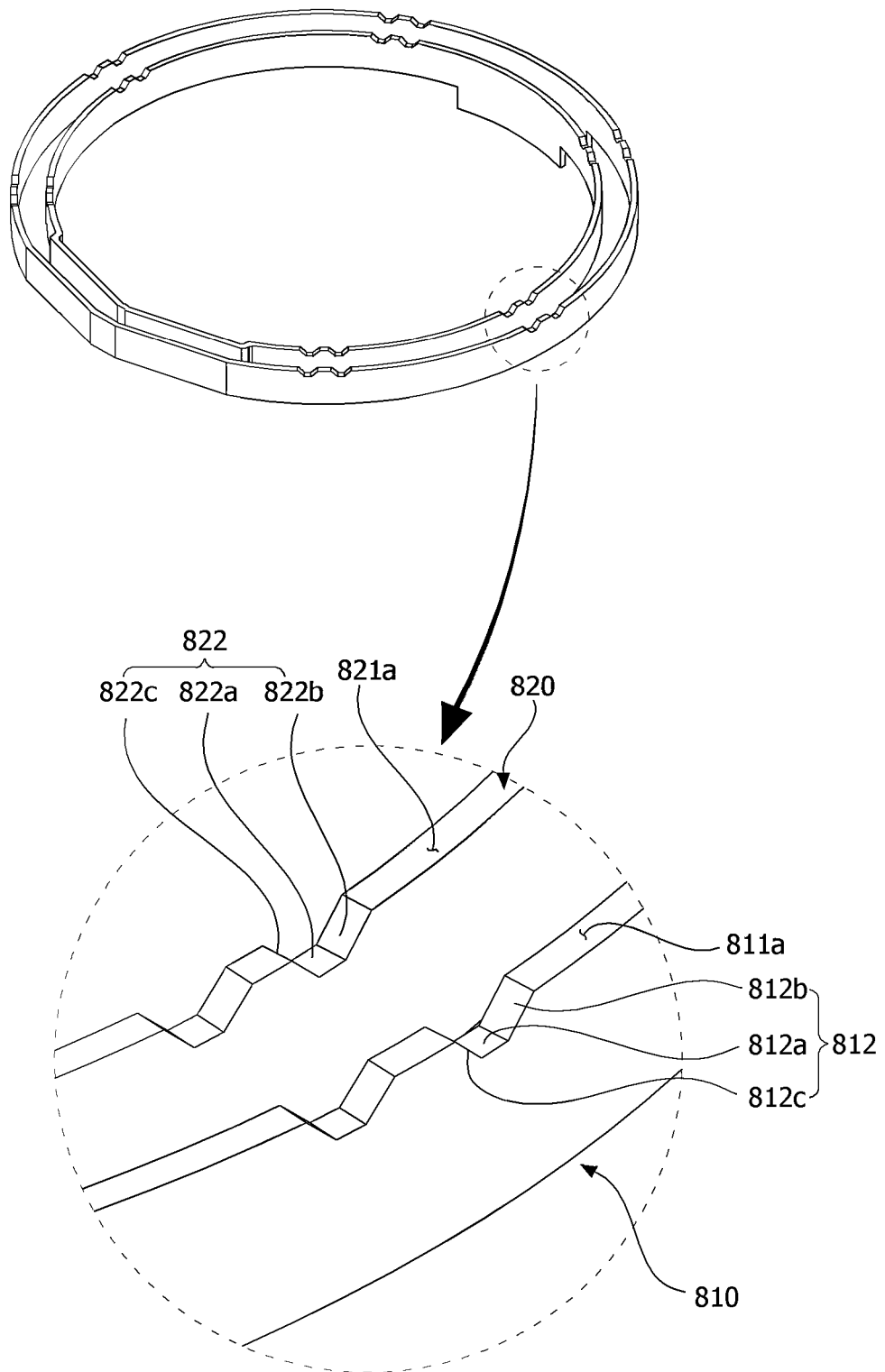

[FIG. 31]
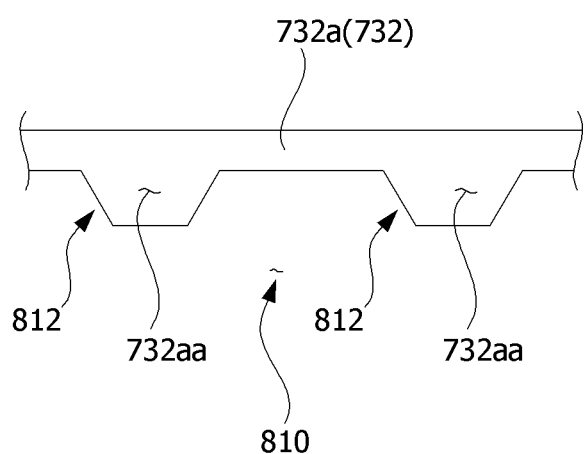

[FIG. 32]
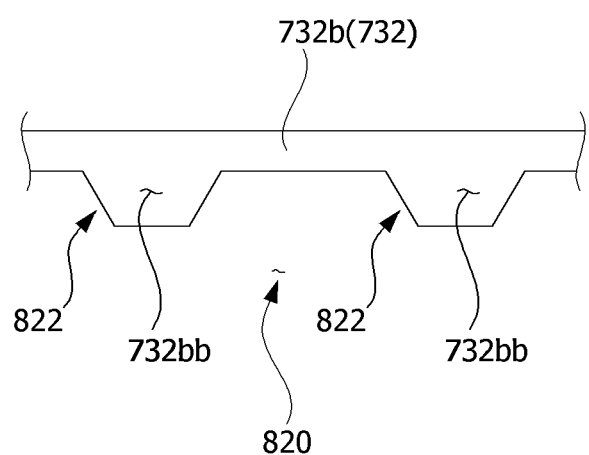

[FIG. 33]
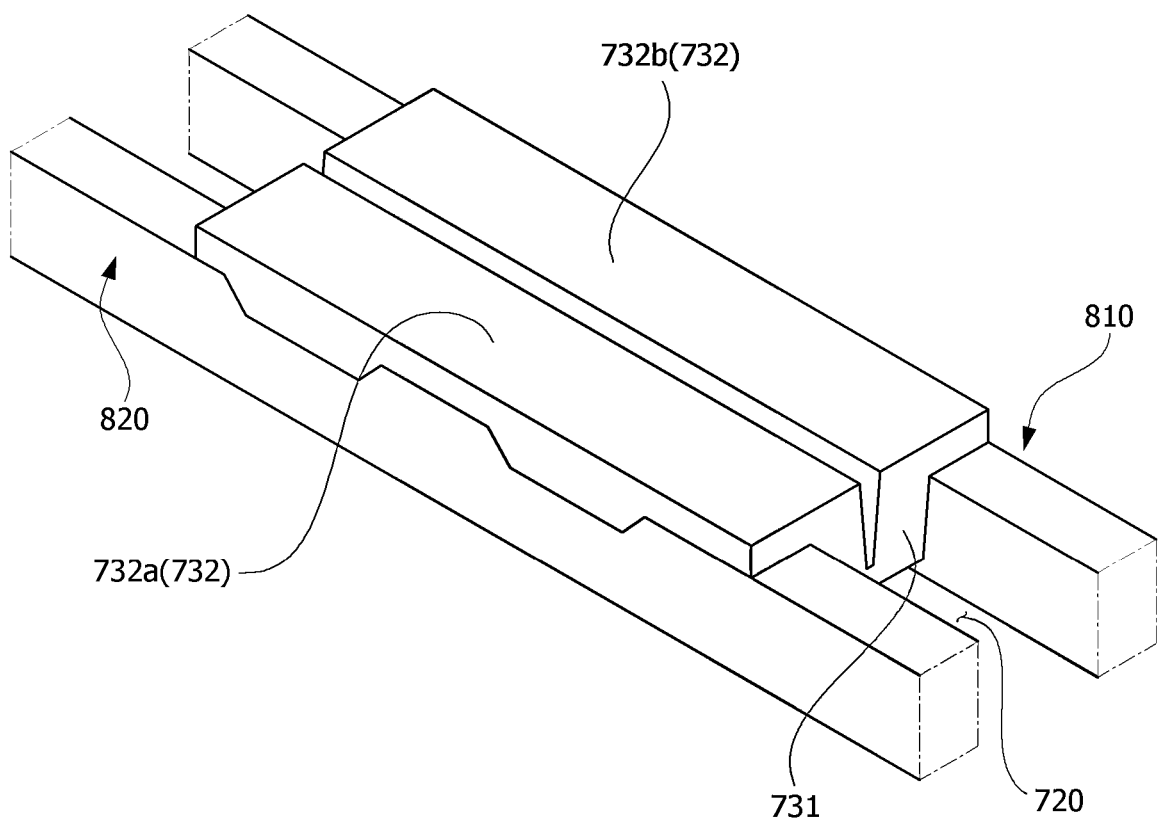

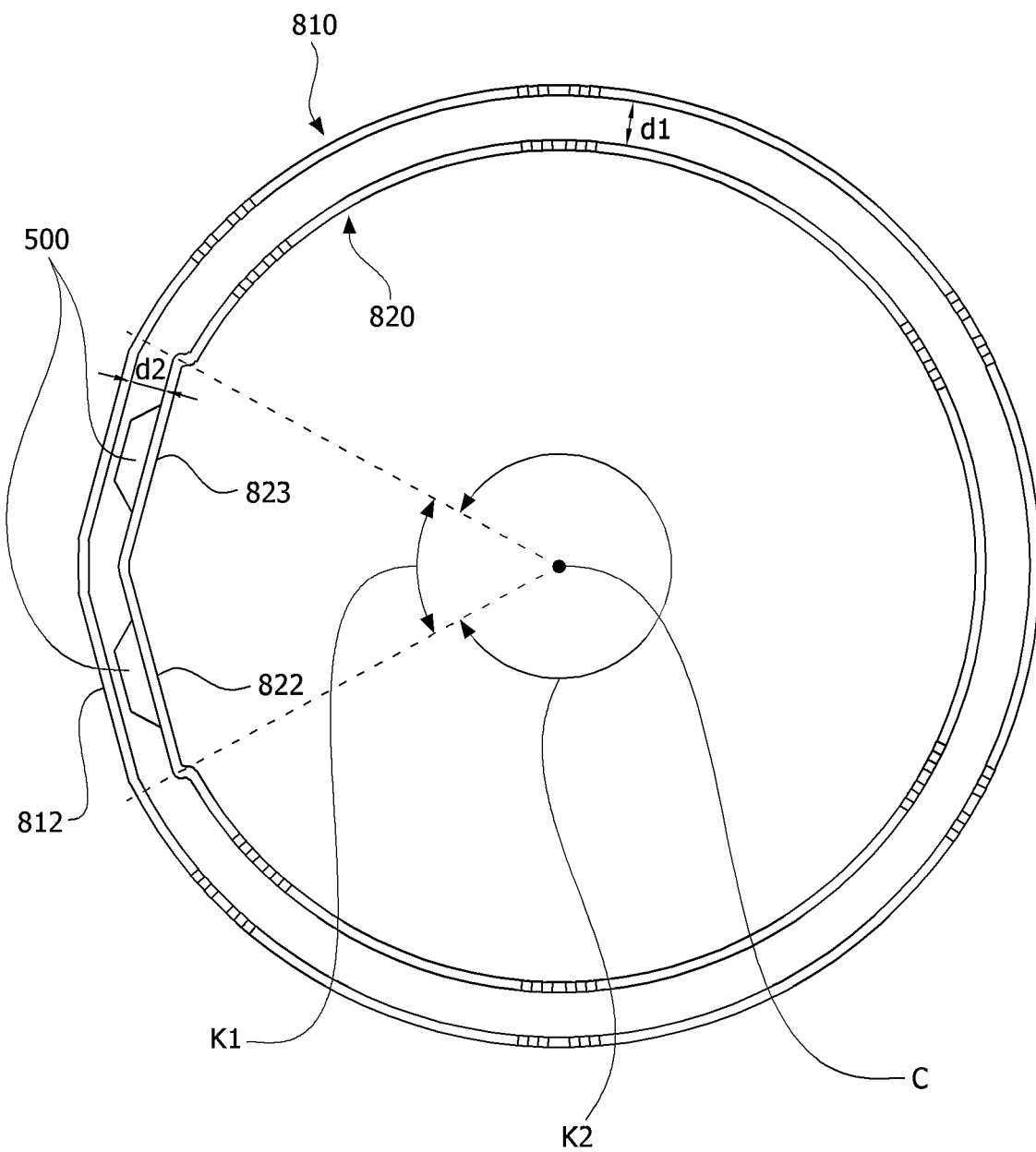
[FIG. 34]

[FIG. 35]
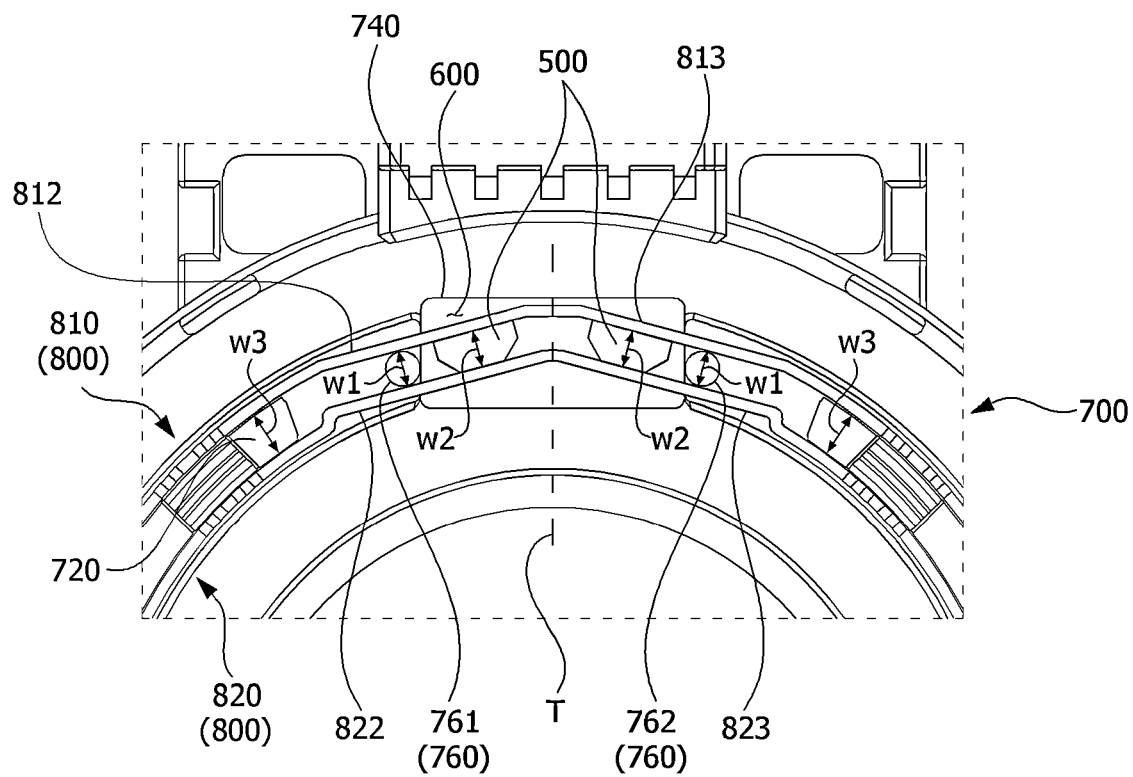

[FIG. 36]
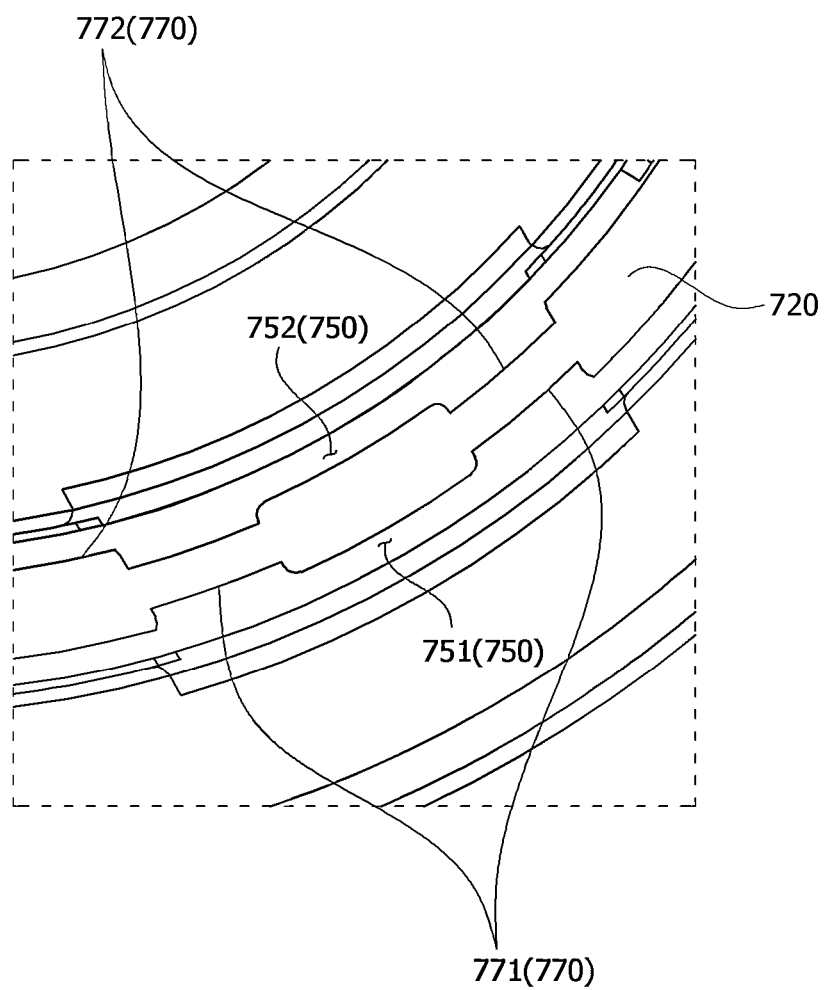

[FIG. 37]
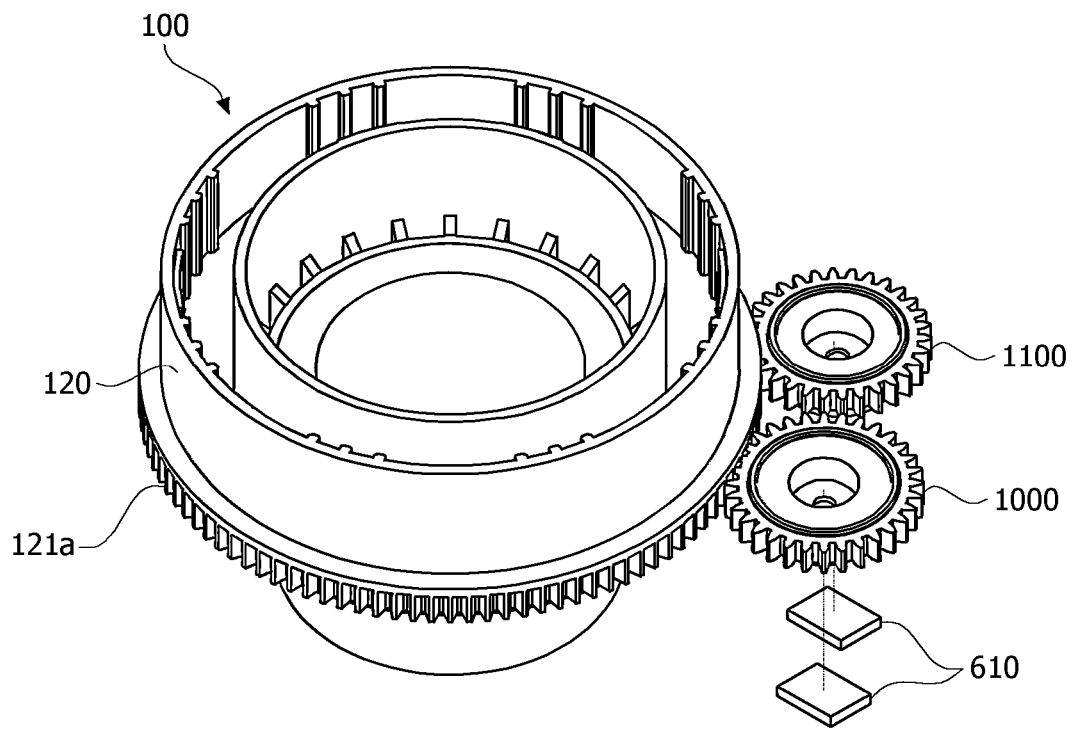

【FIG. 38】
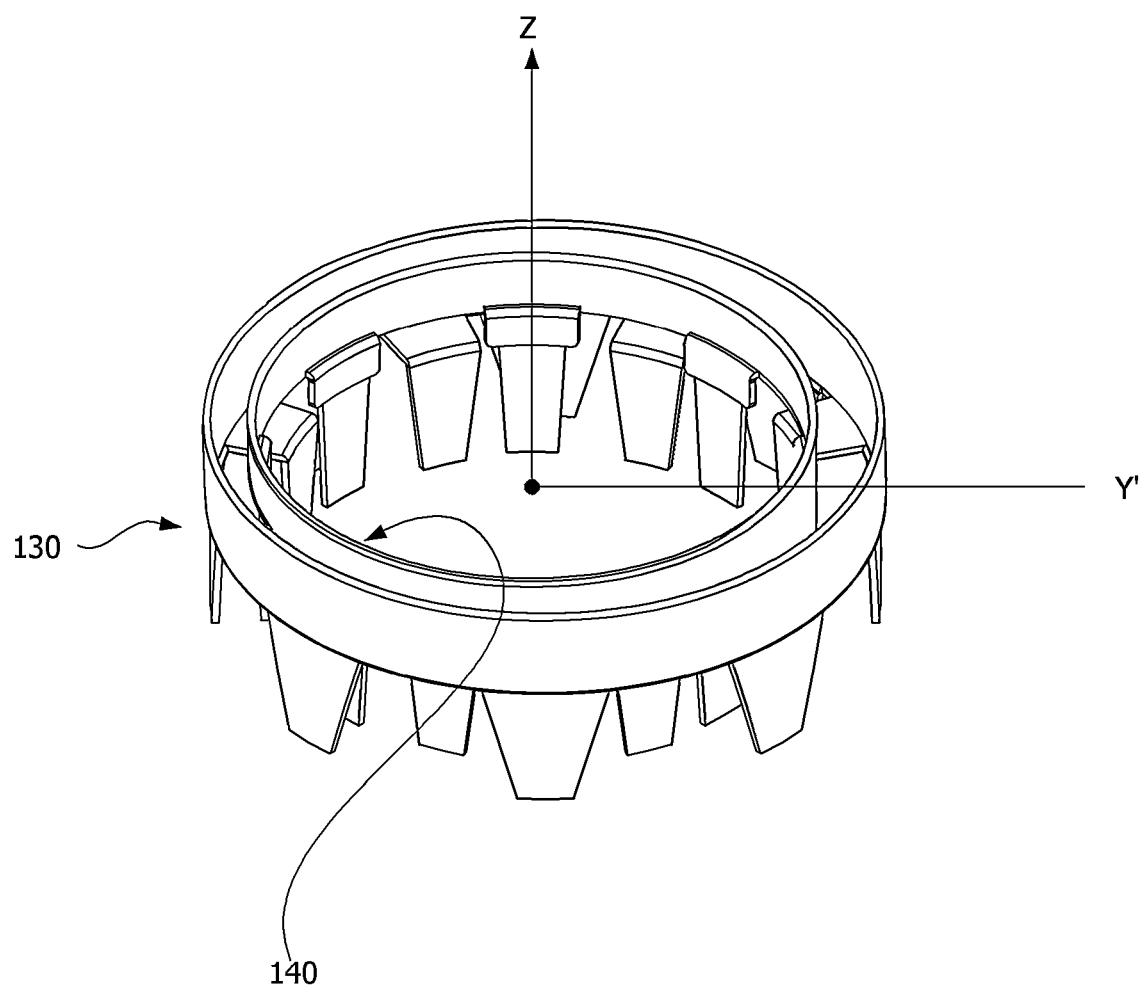

[FIG. 39]
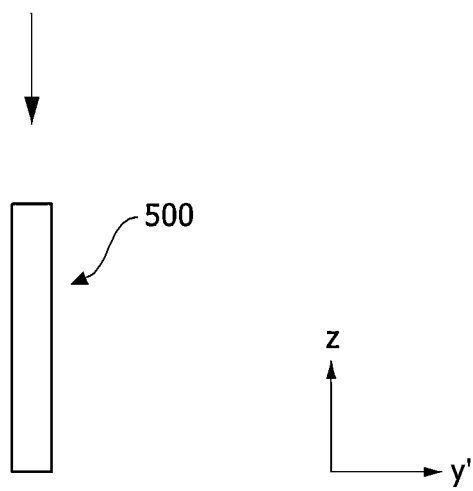

[FIG. 40]
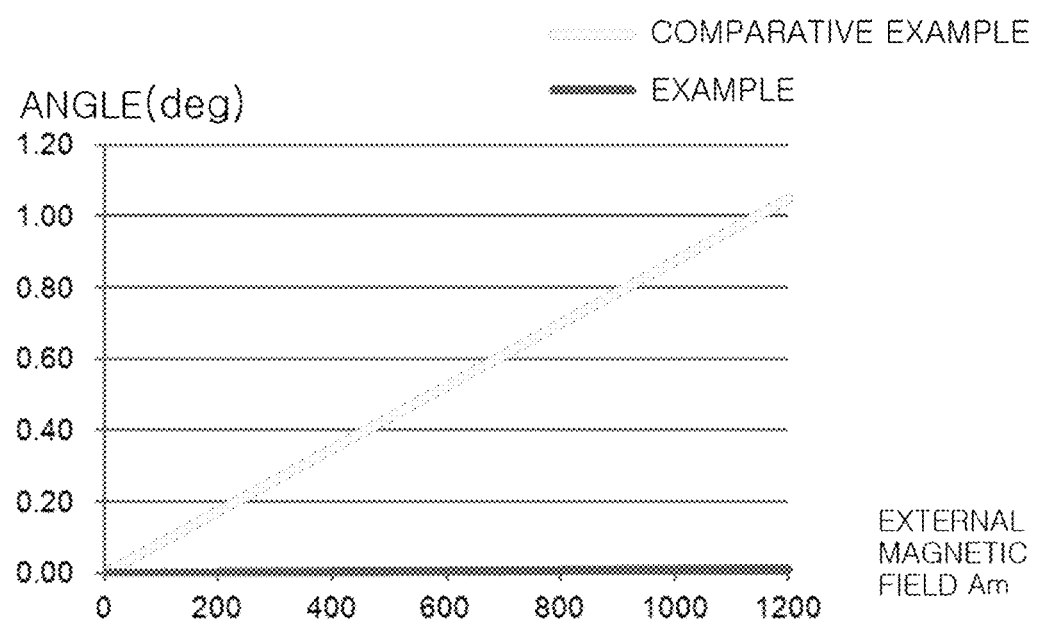

[FIG. 41]
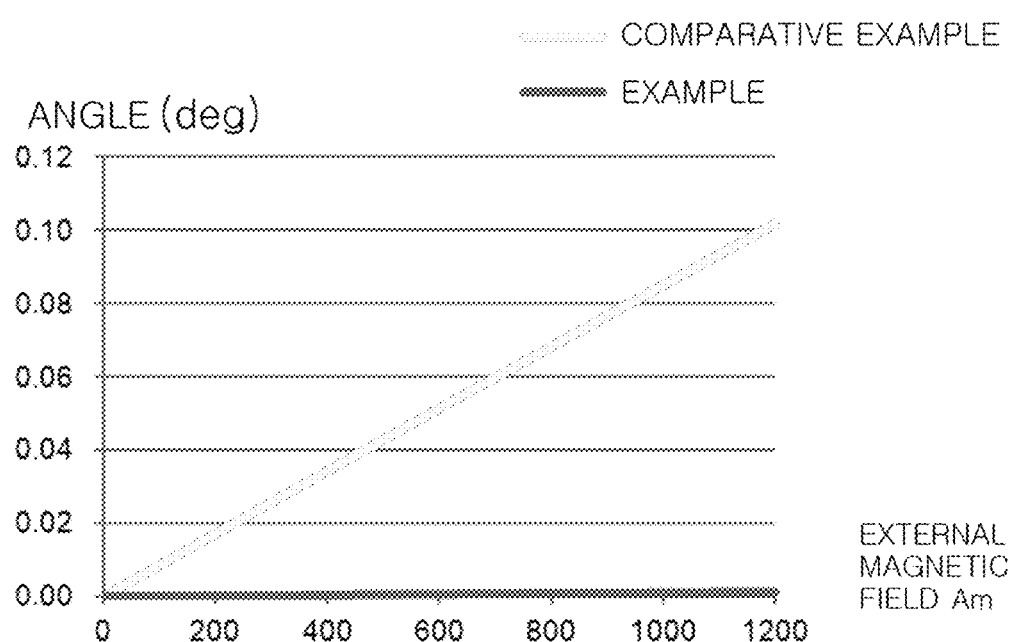

SENSING DEVICE

CROSS-REFERENCE TO RELATED PATENT APPLICATIONS

This application is a U.S. National Stage Application under 35 U.S.C. § 371 of PCT Application No. PCT/KR2020/017298, filed Nov. 30, 2020, which claims priority to Korean Patent Application Nos. 10-2019-0160089 and 10-2019-0160091, both filed Dec. 4, 2019, whose entire disclosures are hereby incorporated by reference.

TECHNICAL FIELD

An embodiment relates to a sensing device.

BACKGROUND ART

In an electronic power steering system (hereinafter referred to as "EPS"), an electronic control unit drives a motor according to driving conditions to secure turning stability and provide a quick restoring force so that a driver may stably travel.

The EPS includes a sensor assembly configured to measure a torque, a steering angle, and the like of a steering shaft to provide a proper torque. The sensor assembly may include a torque sensor configured to measure a torque applied to the steering shaft and an index sensor configured to measure an angular acceleration of the steering shaft. In addition, the steering shaft may include an input shaft connected to a handle, an output shaft connected to a power transmission structure at a side of a wheel, and a torsion bar that connects the input shaft and the output shaft.

The torque sensor measures a torsion degree of the torsion bar to measure a torque applied to the steering shaft. In addition, the index sensor detects rotation of the output shaft to measure an angular acceleration of the steering shaft. In the sensor assembly, the torque sensor and the index sensor may be disposed together and integrally formed.

The torque sensor may include a housing, a rotor, a stator including a stator tooth, and a collector and measure the torque.

In this case, the torque sensor may have a magnetic type structure in which the collector is provided to be disposed outside the stator tooth.

However, when an external magnetic field is generated, since the collector serves as a passage of the external magnetic field in the structure, there is a problem affecting a magnetic flux value of a Hall integrated circuit (IC). Accordingly, a problem occurs in that an output value of the torque sensor is changed and thus the torsion degree of the torsion bar may not be measured accurately.

Particularly, as many electric devices are used in a vehicle, the torque sensor is frequently affected by an external magnetic field, and thus there is a need for a torque sensor that is not affected by the external magnetic field.

Further, in the case of an annular collector, when the housing is moved, a length between the collector and the stator tooth in a radial direction is changed as the housing in which the collector is disposed and the stator tooth are eccentric, and thus, there is a problem in that the sensitivity of the measured magnetic flux increases.

Further, two collectors disposed to face each other in the radial direction may be fused and fixed to the housing. In this case, the collectors may be deformed as a load is applied in the axial direction in the process of fusion, and a problem may occur in that a gap between the collectors in the radial direction is changed. In particular, since a protrusion structure for fusion is disposed between the two collectors, there is a problem in that as the protrusion structure is fused, the collectors are deformed by being pushed outward and inward so that the gap between the two collectors is widened. In addition, a problem occurs in that a position of the collector is changed as the protrusion structure deteriorates after being fused. When the gap between the collectors is changed, a fatal problem may occur in the performance of the sensing device.

DISCLOSURE

Technical Problem

An embodiment is directed to providing a sensing device capable of avoiding magnetic field interference caused by an external magnetic field generated from the outside during torque measurement.

In particular, an embodiment is directed to providing a sensing device capable of preventing a collector from being deformed in a process of fixing the collector to a housing.

Objectives to be achieved by the embodiments are not limited to the above-described objectives, and other objectives, which are not described above, may be clearly understood by those skilled in the art through the following specification.

Technical Solution

An embodiment may provide a motor including a stator including a stator tooth, and a rotor including a magnet, wherein the stator tooth includes a first stator tooth and a second stator tooth disposed inside the first stator tooth, wherein the first stator tooth includes a plurality of first teeth, and the second stator tooth includes a plurality of second teeth, wherein the first tooth overlaps the second tooth in a radial direction from a center of the stator, the motor further includes a sensor and a collector disposed between the first stator tooth and the second stator tooth in the radial direction, a circuit board on which the sensor is disposed, and a housing configured to accommodate the circuit board, wherein the collector includes a first collector and a second collector disposed inside the first collector, the sensor is disposed between the first collector and the second collector in the radial direction, and the housing includes a first protrusion, wherein the first protrusion includes a body disposed between the first collector and the second collector in the radial direction, a head disposed on an upper end of the body, and a first groove, wherein the head includes a first surface and a second surface disposed to face each other, wherein the first surface is in contact with an upper end of the first collector and an upper end of the second collector, and the first groove is concavely disposed on the second surface, and a portion of the first groove is disposed to overlap the first collector and the second collector in the radial direction.

An embodiment may provide a motor including a stator including a stator tooth, and a rotor including a magnet, wherein the stator tooth includes a first stator tooth and a second stator tooth disposed inside the first stator tooth, wherein the first stator tooth includes a plurality of first teeth, and the second stator tooth includes a plurality of second teeth, wherein the first tooth overlaps the second tooth in a radial direction from a center of the stator, the motor further includes a sensor and a collector disposed between the first stator tooth and the second stator tooth in the radial direction, a circuit board on which the sensor is disposed, and a housing configured to accommodate the circuit board, wherein the collector includes a first collector and a second collector disposed inside the first collector, the sensor is disposed between the first collector and the second collector in the radial direction, and the housing includes a first protrusion, wherein the first protrusion includes a body disposed between the first collector and the second collector in the radial direction, and a first extending part and a second extending part that extend from the body, wherein the first extending part and the second extending part are disposed to be spaced apart from each other in the radial direction, a portion of the first extending part is in contact with an upper surface of the first collector, and a portion of the second extending part is in contact with an upper surface of the second collector.

Preferably, the first collector may include a second groove concavely disposed at an upper end thereof, the second collector may include a third groove concavely disposed at an upper end thereof, and the head may include a second protrusion disposed in the second groove and a third protrusion disposed in the third groove.

Preferably, the first collector may include a second groove concavely disposed at an upper end thereof, the second collector may include a third groove concavely disposed at an upper end thereof, the first extending part may include a second protrusion disposed in the second groove, and the second extending part may include a third protrusion disposed in the third groove.

Preferably, the second groove and the third groove may be disposed to correspond to each other in a circumferential direction with respect to the center of the stator.

Preferably, each of the second groove and the third groove may include inclined both side surfaces having different inclination directions from each other, and a bottom surface configured to connect the both side surfaces.

Preferably, the housing may include a second protrusion protruding from the bottom surface, and the second protrusion may be disposed between the first collector and the second collector in the radial direction, and the first protrusion may be disposed to protrude from an upper surface of the second protrusion.

Preferably, the groove may include a region having widths in the radial direction which are different along the axial direction.

Preferably, the first surface may be disposed on a plane perpendicular to the axial direction.

Preferably, an upper end of the first extending part may be disposed to be bent outward, and the upper end of the second extending part may be disposed to be bent inward.

An embodiment may provide a motor including a stator including a stator tooth, and a rotor including a magnet, wherein the stator tooth includes a first stator tooth and a second stator tooth disposed inside the first stator tooth, wherein the first stator tooth includes a plurality of first teeth, and the second stator tooth includes a plurality of second teeth, wherein the first tooth overlaps the second tooth in a radial direction from a center of the stator, the motor further includes a first sensor and a collector disposed between the first stator tooth and the second stator tooth in the radial direction, a circuit board on which the sensor is disposed, and a housing configured to accommodate the circuit board, wherein the collector includes a first collector and a second collector disposed inside the first collector, the first sensor is disposed between the first collector and the second collector in the radial direction, and each of the first collector and the second collector includes a body that is disposed to face the first sensor, and the housing includes a first protrusion, wherein the first protrusion is disposed between the body of the first collector and the body of the second collector in the radial direction and is in contact with an inner surface of the body of the first collector and an outer surface of the body of the second collector.

An embodiment may provide a motor including a stator including a stator tooth, and a rotor including a magnet, wherein the stator tooth includes a first stator tooth and a second stator tooth disposed inside the first stator tooth, wherein the first stator tooth includes a plurality of first teeth, and the second stator tooth includes a plurality of second teeth, wherein the first tooth overlaps the second tooth in a radial direction from a center of the stator, the motor further includes a first sensor and a collector disposed between the first stator tooth and the second stator tooth in the radial direction, a circuit board on which the sensor is disposed, and a housing configured to accommodate the circuit board, wherein the collector includes a first collector and a second collector disposed inside the first collector, and the collector is divided into a first region and a second region having different distances between the first collector and the second collector in the radial direction, and the housing includes a first protrusion, wherein the first protrusion and the sensor are disposed between the first collector and the second collector in the radial direction and disposed together to correspond to one of the first region and the second region.

Preferably, the first protrusion may include a first-first protrusion and a first-second protrusion, wherein the first-first protrusion may be disposed on one side of the first sensor in a circumferential direction, and the first-second protrusion may be disposed on the other side of the first sensor in the circumferential direction.

Preferably, a distance between the first collector and the second collector in the radial direction in the first region may be less than a distance between the first collector and the second collector in the radial direction in the second region, the first protrusion and the first sensor may be disposed in the first region, and the first protrusion may be in contact with the first collector and the second collector in the first region.

Preferably, the housing includes a second protrusion disposed between the first collector and the second collector in a radial direction, and the first protrusion may be disposed to protrude from the second protrusion.

Preferably, the first collector and the second collector may each include a protruding part, and the housing may include a first groove which is disposed to be concave in the axial direction and into which the protruding part is inserted and disposed.

Preferably, the first groove may be disposed to face a hole, through which the first sensor passes, based on a center of the stator.

Preferably, the housing may include a second protrusion disposed between the first collector and the second collector in the radial direction, the first protrusion may be disposed to protrude from the second protrusion, and a partial region of the second protrusion corresponding to the first groove may include a second groove disposed to be concave in the radial direction.

Preferably, the first protrusion may include a curved surface that is in line contact with the first collector and the second collector.

Preferably, a width of the first protrusion in the radial direction may be less than a width of the second protrusion in the radial direction and may be greater than or equal to a width of the sensor in the radial direction.

Advantageous Effects

In a sensing device according to an embodiment having the above-described configuration, since collectors are disposed between a pair of stator teeth, and a sensor is disposed between the collectors, magnetic field interference caused by an external magnetic field generated outside during torque measurement can be prevented or minimized.

Further, by arranging a first tooth of a first stator tooth and a second tooth of a second stator tooth, which are disposed to be spaced apart from each other in a radial direction, to overlap each other and rotating a magnet between the first tooth and the second tooth, the first tooth and the second tooth can be charged as different poles.

Further, a magnitude of flux being collected can be increased.

Further, magnetic field interference caused by an external magnetic field introduced from an inside of a stator holder can be prevented or minimized.

Further, magnetic field interference caused by an external magnetic field introduced from a side surface of a sensing device can be prevented or minimized.

Further, sensor performance can be secured by preventing a collector from being deformed in a process of fixing the collector to a housing. In particular, a gap between the collectors in a radial direction remains unchanged, so that the performance of a sensing device can be secured.

Various advantages and effects of the embodiments are not limited to the above description and can be more easily understood through the description of specific exemplary embodiments.

DESCRIPTION OF DRAWINGS

FIG. 1 is an exploded perspective view illustrating a sensing device according to an embodiment.

FIG. 2 is a perspective view illustrating a stator of the sensing device according to the embodiment.

FIG. 3 is a cross-sectional view illustrating the stator of the sensing device according to the embodiment.

FIG. 4 is a plan view illustrating a stator body of the stator.

FIGS. 5 and 6 are cross-sectional views illustrating the stator body of the stator.

FIG. 7 is a side view illustrating a first stator tooth.

FIG. 8 is a side view illustrating a second stator tooth.

FIG. 9 is a plan view illustrating the first stator tooth, the second stator tooth, and a magnet.

FIG. 10 is a view illustrating a first pole and a second pole of the magnet.

FIG. 11 is a view illustrating a second angle.

FIG. 12 is a view illustrating a third angle.

FIG. 13 is a graph illustrating a flux with respect to a first angle, the second angle, and the third angle.

FIG. 14 is a perspective view illustrating an arrangement of the magnet with respect to the first stator tooth and the second stator tooth.

FIG. 15 is a perspective view illustrating the first stator tooth.

FIG. 16 is a perspective view illustrating the second stator tooth.

FIG. 17 is a plan view of the first stator tooth.

FIG. 18 is a plan view of the first stator tooth and the second stator tooth.

FIG. 19 is a view illustrating first teeth, second teeth, and third teeth disposed on a concentric circle.

FIG. 20 is a plan view of the first stator tooth and the second stator tooth, which illustrates the flow of an external magnetic field introduced from an inside of a stator holder.

FIG. 21 is a cross-sectional view of the first stator tooth, which illustrates the flow of an external magnetic field guided to the third teeth.

FIG. 22 is a perspective view illustrating a first collector.

FIG. 23 is a perspective view illustrating a second collector.

FIG. 24 is a plan view of the first collector, the second collector, and a first sensor.

FIG. 25 is a view illustrating the stator teeth and a state in which the stator teeth avoid an external magnetic field.

FIG. 26 is a view illustrating a housing and the collector.

FIG. 27 is a view illustrating the housing.

FIG. 28 is a view illustrating a first protrusion.

FIG. 29 is a view illustrating a fusing process of the first protrusion.

FIG. 30 is a view illustrating the collector in which a second groove and a third groove are disposed.

FIG. 31 is a view illustrating a third protrusion disposed in the second groove of the first collector.

FIG. 32 is a view illustrating a fourth protrusion disposed in the third groove of the second collector.

FIG. 33 is a view illustrating a portion of the first collector and a portion of the second collector that are fixed to the housing by the first protrusion.

FIG. 34 is a view illustrating the collector divided into a first region and a second region.

FIG. 35 is a view illustrating the first protrusion and the first sensor disposed between the first collector and the second collector.

FIG. 36 is a view illustrating the housing in which a first groove and a second groove are disposed.

FIG. 37 is a view illustrating a first gear and a second gear that are engaged with a main gear.

FIG. 38 is a view illustrating a directionality of an external magnetic field with respect to the stator teeth.

FIG. 39 is a view illustrating a state in which the first sensor avoids an external magnetic field having a z-axis directionality.

FIG. 40 is a graph illustrating a comparison of an amount of change in angle with respect to an external magnetic field in the z-axis direction between Comparative Example and Example.

FIG. 41 is a graph illustrating a comparison of an amount of change in angle with respect to the external magnetic field in the y'-axis direction between Comparative Example and Example.

MODES OF THE INVENTION

FIG. 1 is an exploded perspective view illustrating a sensing device according to an embodiment, and FIG. 2 is a perspective view illustrating a stator of the sensing device according to the embodiment. In FIGS. 1 and 2, a z-direction represents an axial direction, and a y-direction represents a radial direction. In addition, the axial direction and the radial direction are perpendicular to each other.

Referring to FIGS. 1 and 2, the sensing device according to the embodiment may include a stator 100, a rotor 200 of which a portion is disposed in the stator 100, a first sensor 500, a circuit board 600 electrically connected to the first sensor 500, and a housing 700 to which the circuit board 600 is coupled.

Here, the stator 100 may be connected to an output shaft (not shown), and the rotor 200 of which at least a portion is rotatably disposed in the stator 100 may be connected to an input shaft (not shown), but the present invention is not necessarily limited thereto.

In this case, the rotor 200 may be rotatably disposed with respect to the stator 100. Hereinafter, the term "inside" may represent a direction of being disposed toward a center C in the radial direction, and the term "outside" may represent a direction opposite to "inside."

FIG. 3 is a cross-sectional view illustrating the stator of the sensing device according to the embodiment.

The stator 100 may be connected to the output shaft (not shown) of a steering shaft.

Referring to FIGS. 1 to 3, the stator 100 may include a stator holder 110, a stator body 120, a first stator tooth 130, and a second stator tooth 140.

The stator holder 110 may be connected to an output shaft of an electric steering apparatus. Accordingly, the stator holder 110 may rotate in conjunction with the rotation of the output shaft. The stator holder 110 may be formed in a cylindrical shape. In addition, the stator holder 110 may be formed of a metal material but is not necessarily limited thereto, and the stator holder 110 may also be formed of another material in consideration of a predetermined strength or more so that the input shaft can be fitted and fixed.

The stator holder 110 may include a groove 111. The groove 111 is concavely formed in an outer circumferential surface of the stator holder 110. The groove 111 is disposed along the outer circumferential surface of the stator holder 110. A separate fixing member may be inserted into the groove 111.

The stator holder 110 may be coupled to the stator body 120.

The stator body 120 may be disposed on one side end portion of the stator holder 110. The stator body 120 may be coupled to the stator holder 110 through an insert-injection molding method using a synthetic resin such as a resin. A main gear 121a may be formed in an outer circumferential surface of the stator body 120. The main gear 121a transmits a rotational force of the stator 100 to a first gear 1000 (see FIG. 37) and a second gear 1100 (see FIG. 37).

The first stator tooth 130 and the second stator tooth 140 may be disposed to be spaced apart from each other in the radial direction. In addition, the first stator tooth 130 and the second stator tooth 140 may be fixed to the stator body 120. The first stator tooth 130 includes a first body 131, a first tooth 132, and a third tooth 133. The second stator tooth 140 includes a second body 141 and a second tooth 142.

FIG. 4 is a plan view illustrating the stator body of the stator, and FIGS. 5 and 6 are cross-sectional views illustrating the stator body of the stator.

Referring to FIGS. 4 to 6, the stator body 120 includes an inner part 121, an outer part 122, and a partition plate 123. Each of the inner part 121 and the outer part 122 has a cylindrical shape. The outer part 122 is disposed to be spaced outward from the inner part 121 in the radial direction. The partition plate 123 connects the inner part 121 and the outer part 122. The inner part 121, the outer part 122, and the partition plate 123 may be integrally formed. The stator holder 110 may be coupled to an inner side of the inner part 121. A space S may be formed between the outer part 122 and the inner part 121. The partition plate 123 may be formed in a plate shape. The partition plate 123 may be disposed between the inner part 121 and the outer part 122.

The space S may be divided into a first space S1 and a second space S2 by the partition plate 123. The first sensor 500 may be disposed in the first space S1, and a magnet 230 may be disposed in the second space S2. The partition plate 123 may be disposed below a virtual horizontal line L1. Here, the virtual horizontal line L1 passes through a center of the outer part 122 in the axial direction.

Meanwhile, the partition plate 123 may include a first hole 124 and a second hole 125. The first hole 124 and the second hole 125 are for arranging the first stator tooth 130 and the second stator tooth 140.

The first body 131 and the second body 141 may be disposed in the first space S1. The first tooth 132 and the second tooth 142 may be disposed in the second space S2.

A plurality of first holes 124 may be formed to be spaced apart from each other in a circumferential direction. In addition, the first tooth 132 is disposed in the second space S2 by passing through the first hole 124. In this case, the number of first holes 124 is the same as the number of first teeth 132. The first hole 124 may be disposed adjacent to an inner circumferential surface of the outer part 122. As illustrated in FIG. 8, the first hole 124 may be formed in the partition plate 123 to be in contact with the inner circumferential surface of the outer part 122.

A plurality of second holes 125 may be formed to be spaced apart from each other in the circumferential direction. In this case, the second hole 125 may be disposed to be spaced inward from the first hole 124 in the radial direction. In addition, the second tooth 142 is disposed in the second space S2 by passing through the second hole 125. In this case, the number of second holes 125 is the same as the number of second teeth 142 of the second stator tooth 140. The second hole 125 may be disposed adjacent to an outer circumferential surface of the inner part 121. The second hole 125 may be formed in the partition plate 123 to be in contact with the outer circumferential surface of the inner part 121.

A plurality of third holes 127 may be formed to be spaced apart from each other in the circumferential direction. The third hole 127 may be disposed between the second hole 125 and the second hole 125 in the circumferential direction. The third tooth 133 is disposed in the second space S2 by passing through the third hole 127. In this case, the number of third holes 127 may be the same as the number of the third teeth 133 of the first stator tooth 130. The third hole 127 may be disposed adjacent to the outer circumferential surface of the inner part 121. The third hole 127 may be formed in the partition plate 123 to be in contact with the outer circumferential surface of the inner part 121.

The first stator tooth 130 and the second stator tooth 140 may be disposed between the outer circumferential surface of the inner part 121 of the stator body 120 and the inner circumferential surface of the outer part 122. Here, the first stator tooth 130 and the second stator tooth 140 may be formed of a metal material to be charged by rotation of the magnet 230.

In addition, the first stator tooth 130 may be fixed to the inner circumferential surface of the outer part 122 by an adhesive member (not shown) such as a glue, and the second stator tooth 140 may be fixed to the outer circumferential surface of the inner part 121 by an adhesive member (not shown) such as a glue, but the present invention is not necessarily limited thereto. For example, the first stator tooth 130 and the second stator tooth 140 may be fixed to the stator body 120 by coupling members (not shown), through a caulking method, or the like.

A boss 126 is disposed to extend downward from the partition plate 123. A sidewall of the boss 126 and the outer part 122 are spaced apart from each other to form a first slot U1. The first tooth 132 is inserted into the first slot U1 and passes through the first hole 124 to be positioned in the second space S2. In addition, the sidewall of the boss 126 and the inner part 121 are spaced apart from each other to form a second slot U2. The second tooth 142 and the third tooth 133 are inserted into the second slot U2 and respectively pass through the second hole 125 and the third hole 127 to be positioned in the second space S2.

In a process in which the first stator tooth 130 is coupled to the stator body 120, the first slot U1 guides the first tooth 132 to the first hole 124 so that the first stator tooth 130 is easily coupled to the stator body 120.

In a process in which the second stator tooth 140 is coupled to the stator body 120, the second slot U2 guides the second tooth 142 and the third tooth 133 to the second hole 125 and the third hole 127, respectively, so that the second stator tooth 140 is easily coupled to the stator body 120.

FIG. 7 is a side view illustrating the first stator tooth, and FIG. 8 is a side view illustrating the second stator tooth.

Referring to FIGS. 2 and 7, the first stator tooth 130 may include the first body 131 and a plurality of first teeth 132 spaced apart from each other and protruding from the first body 131 in the axial direction.

Referring to FIGS. 2 and 8, the second stator tooth 140 may include the second body 141 and a plurality of second teeth 142 spaced apart from each other and protruding from the second body 141 in the axial direction.

A height H1 of the first body 131 is less than a height H2 of the first tooth 132 based on an upper surface 131a of the first body 131. In addition, a height H3 of the second body 141 is less than a height H4 of the second tooth 142 based on an upper surface 141a of the second body 141. However, the present invention is not limited thereto, and the height H2 of the first tooth 132 may be different from the height H4 of the second tooth 142.

FIG. 9 is a plan view illustrating the first stator tooth, the second stator tooth, and the magnet.

Referring to FIG. 9, the first stator tooth 130 is disposed outside the second stator tooth 140. When viewed in the radial direction (y-direction), the first tooth 132 and the second tooth 142 may be disposed to overlap in the radial direction. Such an arrangement of the first tooth 132 and the second tooth 142 has an effect of reducing magnetic flux leakage.

FIG. 10 is a view illustrating a first pole and a second pole of the magnet.

Referring to FIG. 10, the magnet includes first poles 230A and second poles 230B. The first poles 230A and the second poles 230B may be alternately disposed along a circumferential direction of the magnet.

Each of the first pole 230A and the second pole 230B may include an N-pole region N and an S-pole region S. Each of the first pole 230A and the second pole 230B may have a multilayer structure in which the N-pole region N and the S-pole region S are positioned at inner and outer sides thereof.

In the first pole 230A, the N-pole region N may be disposed at a relatively outer side, and the S-pole region S may be disposed at an inner side of the N-pole region N. In the second pole 230B, the N-pole region N may be disposed at a relatively inner side, and the S-pole region S may be disposed at an outer side of the N-pole region N.

The N-pole region N of the first pole 230A and the S-pole region S of the second pole 230B are disposed adjacent to each other. The S-pole region S of the first pole 230A and the N-pole region N of the second pole 230B are disposed adjacent to each other.

When the magnet 230 rotates so that the first tooth 132 approaches the S-pole region S and is charged as an S-pole, since the second tooth 142 approaches the N-pole region N, the second tooth 142 is charged as an N-pole. Alternatively, when the magnet 230 rotates so that the first tooth 132 approaches the N-pole region N and is charged as an N-pole, since the second tooth 142 approaches the S-pole region S, the second tooth 142 is charged as an S-pole. Accordingly, the first sensor 500 may measure an angle using a magnetic field applied through the first stator tooth 130, the second stator tooth 140, and a collector 800 (see FIG. 22).

In the sensing device according to the embodiment, the first tooth 132 and the second tooth 142 overlap each other in the radial direction. Both ends of the second tooth 142 may overlap the first tooth 132. For example, in designing positions and sizes of the first tooth 132 and the second tooth 142, a first angle $\Theta1$, a second angle $\Theta2$ (see FIG. 11), and a third angle $\Theta3$ (see FIG. 12) may be the same.

The first angle $\Theta1$ represents an angle formed by both ends of the first pole 230A based on the center C of the stator. For example, in a case in which there are eight first poles 230A and eight second poles 230B, the first angle $\Theta1$ may be 22.5°.

FIG. 11 is a view illustrating the second angle $\Theta2$, and FIG. 12 is a view illustrating the third angle $\Theta3$.

Referring to FIG. 11, the second angle $\Theta2$ represents an angle formed by both ends P1 of the first tooth 132 based on the stator center C. A reference point G for defining the both ends P1 of the first tooth 132 in the axial direction is as follows. The reference point G corresponds to a point of the first tooth 132, which corresponds to an intermediate point of a height H1 of a body 231 of the magnet 230 when the first tooth 132 is disposed to face the body 231 of the magnet 230. The height H1 of the body 231 of the magnet 230 represents a height between an upper surface 231a and a lower surface 231b of the magnet 230 in the axial direction. A fourth angle $\Theta4$ between the first tooth 132 and the first tooth 132 at the reference point G may be the same as the second angle $\Theta2$.

Referring to FIG. 12, the third angle $\Theta3$ represents an angle formed by both ends P2 of the second tooth 142 based on the stator center C. A reference point G for defining the both ends P2 of the second tooth 142 in the axial direction is as follows. The reference point G corresponds to a point of the second tooth 142, which corresponds to the intermediate point of the height H1 of the body 231 of the magnet 230 when the second tooth 142 is disposed to face the body 231 of the magnet 230. A fifth angle $\Theta5$ between the second tooth 142 and the second tooth 142 at the reference point G may be the same as the third angle $\Theta3$.

FIG. 13 is a graph illustrating a flux with respect to the first angle $\Theta1$, the second angle $\Theta2$, and the third angle $\Theta3$.

Referring to FIG. 13, it can be confirmed that in a state in which the second angle $\Theta2$ and the third angle $\Theta3$ are set to be the same, as the second angle $\Theta2$ and the third angle $\Theta3$ become closer to the first angle $\Theta1$, a flux magnitude increases, and as the second angle $\Theta2$ and the third angle $\Theta3$ become farther away from the first angle $\Theta1$, the flux magnitude decreases. It can be seen that, in a case in which sizes and positions of the first tooth 132 and the second tooth 142 are arranged so that the second angle $\Theta2$ and the third angle $\Theta3$ are the same as the first angle $\Theta1$, the flux magnitude of the first and second stator teeth 130 and 140 is the greatest.

Referring to FIG. 1, the rotor 200 may include a rotor holder 210, a rotor body 220, and the magnet 230. The rotor holder 210, the rotor body 220, and the magnet 230 may be integrally formed.

The rotor holder 210 may be connected to the input shaft of the electric steering apparatus. Accordingly, the rotor holder 210 may be rotated in conjunction with the rotation of the input shaft. The rotor holder 210 may be formed in a cylindrical shape. In addition, an end portion of the rotor holder 210 may be coupled to the rotor body 220. The rotor holder 210 may be formed of a metal material but is not necessarily limited thereto, and the rotor holder 210 may also be formed of another material in consideration of a predetermined strength or more so that the input shaft can be fitted and fixed.

The rotor body 220 is disposed on one side of an outer circumferential surface of the rotor holder 210. The rotor body 220 may be an annular member.

The magnet 230 is coupled to the rotor body 220. When the rotor holder 210 rotates, the magnet 230 is rotated in conjunction with the rotation of the rotor holder 210.

FIG. 14 is a perspective view illustrating an arrangement of the magnet with respect to the first stator tooth and the second stator tooth.

Referring to FIG. 14, the magnet 230 is disposed between the first tooth 132 and the second tooth 142. In addition, the magnet 230 is disposed between the third tooth 133 and the first tooth 132.

The body 231 of the magnet 230 is disposed to face the first tooth 132, the second tooth 142, and the third tooth 133. A protrusion 232 of the magnet 230 is disposed above the first tooth 132, the second tooth 142, and the third tooth 133.

FIG. 15 is a perspective view illustrating the first stator tooth.

Referring to FIG. 15, the first stator tooth 130 may include the first body 131, the first tooth 132, the third tooth 133, and an extending part 134. The first body 131 may be a ring-shaped member. The first teeth 132 may be disposed to be spaced apart from each other along the circumferential direction, and may extend upward from an upper side of the first body 131. The first body 131 and the plurality of first teeth 132 may be integrally formed. The extending part 134 protrudes inward from the first body 131. The third tooth 133 is connected to the extending part 134.

The first tooth 132 and the third tooth 133 may each be formed in a shape of which a lower side is wide and an upper side is narrow. For example, when viewed in the radial direction, in each of the first tooth 132 and the third tooth 133, a width of the lower side may be greater than a width of the upper side. The first tooth 132 and the third tooth 133 may each be formed in a trapezoidal shape. In addition, since the first tooth 132 passes through the first hole 124 and the third tooth 133 passes through the third hole 127, the upper surface of the first body 131 and an upper surface of the extending part 134 may be in contact with a lower surface of the partition plate 123.

FIG. 16 is a perspective view illustrating the second stator tooth.

Referring to FIG. 16, the second stator tooth 140 may include the second body 141 and the second tooth 142. The second teeth 142 may be disposed to be spaced apart from each other along the circumferential direction, and may extend upward from an upper side of the second body 141. The second body 141 and the plurality of second teeth 142 may be integrally formed. The second tooth 142 may be formed in a shape of which a lower side is wide and an upper side is narrow. For example, when viewed in the radial direction, a lower side width of the second tooth 142 may be greater than an upper side width thereof. The second tooth 142 may include a trapezoidal shape.

The second body 141 may include a protruding part 141a. The protruding part 141a may be an annular member that is bent and protrudes outward with respect to the second tooth 142. The protruding part 141a may increase the amount of flux applied to the first sensor 500 by reducing an air gap between the first sensor 500 and the second body 141.

FIG. 17 is a plan view of the first stator tooth.

Referring to FIG. 17, a shortest distance R1 from a center C of the first stator tooth 130 to the first tooth 132 is greater than a shortest distance R2 from the center C of the first stator tooth 130 to the third tooth 133. The third tooth 133 is disposed relatively closer to the center C of the first stator tooth 130 than the first tooth 132. This is to guide an external magnetic field introduced from an inside of the stator holder 110 to the third tooth 133.

FIG. 18 is a plan view of the first stator tooth and the second stator tooth.

Referring to FIG. 18, a diameter D3 formed by the plurality of third teeth 133 is less than a diameter D1 formed by the plurality of first teeth 132, and a diameter D2 formed by the plurality of second teeth 142 is less than the diameter D1 formed by the plurality of first teeth 132. Based on the magnet 230, the first tooth 132 is disposed on an outer side of the magnet 230, and the second tooth 142 and the third tooth 133 are disposed on an inner side of the magnet 230.

FIG. 19 is a view illustrating the first teeth, the second teeth, and the third teeth disposed on a concentric circle.

Referring to FIG. 19, the first teeth 132, the second teeth 142, and the third teeth 133 may be disposed on a concentric circle. The second teeth 142 and the third teeth 133 may be disposed on a virtual first circumference O1, and the first teeth 132 may be disposed on a virtual second circumference O2 different from the virtual first circumference O1. The second teeth 142 and the third teeth 133 may be alternately disposed along a circumferential direction of the stator 100. The first circumference O1 is disposed further inward than the second circumference O2. This is to distribute the external magnetic field, which is introduced from the inside of the stator holder 110, in any direction through the second teeth 142 and the third teeth 133.

Meanwhile, a width t3 of a lower end of the third tooth 133 in the circumferential direction may be less than a width t1 of a lower end of the first tooth 132 in the circumferential direction. In addition, the width t3 of the lower end of the third tooth 133 in the circumferential direction may be less than a width t2 of a lower end of the second tooth 142 in the circumferential direction.

FIG. 20 is a plan view of the first stator tooth and the second stator tooth, which illustrates the flow of an external magnetic field introduced from the inside of the stator holder, and FIG. 21 is a cross-sectional view of the first stator tooth illustrating the flow of an external magnetic field guided to the third teeth.

Referring to FIG. 20, external magnetic fields W1 and W2 introduced along the stator holder 110 are introduced into the first stator tooth 130 and the second stator tooth 140 in the radial direction of the stator 100. The external magnetic fields W1 and W2 are distributed and guided to the third teeth 133 and the second teeth 142.

Referring to FIG. 21, the external magnetic field W1 introduced into the third tooth 133 is guided to the extending part 134. In this case, an external magnetic field M1 introduced into the third tooth 133 may be introduced into the first tooth 132 from the magnet 230, and may be cancelled out with an external magnetic field M2 guided to the extending part 134. As described above, since an external magnetic field introduced along the stator holder 110 is guided to the first stator tooth 130 and cancelled out, it is possible to greatly reduce an effect of the external magnetic field to the first sensor 500.

Table 1 below illustrates a comparison of a torque between Comparative Example and Example.

TABLE 1

|  | Torque (Nm) of Comparative Example | Torque (Nm) of Example |
|---|---|---|
| External magnetic field in radial direction 1000 A/m | 0.41 Nm | 0.05 Nm |

A sensing device of Comparative Example does not have a structure such as the third tooth 133. A sensing device of Example has the third tooth 133. When there is no external magnetic field in the radial direction, the torque is 0 Nm that is normal. When an external magnetic field of 1000 A/m in the radial direction is applied in Comparative Example and Example, in the case of Comparative Example, a torque of 0.4 Nm is measured, and it can be seen that it is greatly affected by the external magnetic field. However, in the case of Example, the measured torque is 0.05 Nm, and it can be seen that it is barely affected by the external magnetic field.

However, a gap between the first and second stator teeth 130 and 140 and the first sensor 500 in the radial direction determines the amount of flux. When the gap between the first and second stator teeth 130 and 140 and the first sensor 500 increases, a flux passing through the first sensor 500 increases to increase the sensitivity of a measured magnetic flux. In contrast, when the gap between the first and second stator teeth 130 and 140 and the first sensor 500 decreases, a flux passing through the first sensor 500 decreases to decrease the sensitivity of the measured magnetic flux. Thus, a wobble value may be greatly increased according to a variation of the gap between the first and second stator teeth 130 and 140 and the first sensor 500.

FIG. 22 is a perspective view illustrating a first collector, FIG. 23 is a perspective view illustrating a second collector, and FIG. 24 is a plan view of the first collector, the second collector, and the first sensor 500.

Referring to FIGS. 22 to 24, the collector 800 may include a first collector 810 and a second collector 820. The first collector 810 and the second collector 820 each collect a flux of the stator 100. In addition, the first collector 810 and the second collector 820 may each be formed of a metal material. A distance between the first collector 810 and the second collector 820 in the radial direction has "d1" of FIG. 24.

Based on the center C of the stator, the second collector 820 may be disposed further inward than the first collector 810 in the radial direction. The first collector 810 and the second collector 820 may each be a ring-shaped member. Since each of the first collector 810 and the second collector 820 is a ring-shaped member, the collector 800 may cover the entire region of the first and second stator teeth 130 and 140 along the circumferential direction. As a result, in consideration of the entire region of the first and second stator teeth 130 and 140, the sensitivity of the magnetic flux measured according to the variation of the gap between the first and second stator teeth 130 and 140 and the first sensor 500 is complementarily stabilized, thereby improving the wobble value.

The first collector 810 and the second collector 820 may include extending parts 811 and 821, first bodies 812 and 822, and second bodies 813 and 823, respectively. Each of the first bodies 812 and 822 and the second bodies 813 and 823 is disposed to face the first sensor 500. The second bodies 813 and 823 may respectively extend from the first bodies 812 and 822. The extending parts 811 and 821 may extend from the first bodies 812 and 822 and the second bodies 813 and 823, respectively. The first bodies 812 and 822 and the second bodies 813 and 823 may each include a flat plane. The extending parts 811 and 821 may each include a curved surface. The extending parts 811 and 821 may include protruding parts 814 and 824, respectively. The protruding parts 814 and 824 are disposed to respectively extend downward from lower ends of the extending parts 811 and 821. The protruding parts 814 and 824 are for coupling the housing 700 to the collector 800.

The first sensor 500 detects a change in a magnetic field generated between the stator 100 and the rotor 200. The first sensor 500 may be a Hall integrated-circuit (IC). The first sensor 500 detects an amount of magnetization of the stator 100 generated by an electric interaction between the magnet 230 of the rotor 200 and the stator 100. The sensing device measures a torque based on the detected amount of magnetization.

FIG. 25 is a view illustrating the stator teeth 130 and 140 and a state in which the stator teeth 130 and 140 avoid an external magnetic field.

Referring to FIG. 25, the first collector 810 serves as a shield for an external magnetic field, which is directed to the first sensor 500, together with the first stator tooth 130.

An external magnetic field greatly affects the sensing device in a y'-axis direction. Here, the y'-axis direction refers to a direction toward the first sensor 500 among the radial direction perpendicular to the axial direction. Since the external magnetic field in the y'-axis direction is induced along the first stator tooth 130 and the second stator tooth 140 as depicted as "S1" shown in FIG. 25, the external magnetic field in the y'-axis direction flows out without affecting the first sensor 500. Thus, the sensing device according to the embodiment has an advantage in that an effect of the external magnetic field on the first sensor 500 is small even in the y'-axis direction.

Further, since an external magnetic field directed to the first sensor 500 through the first stator tooth 130 may be induced as depicted as "S2" shown in FIG. 25 due to the first collector 810, the external magnetic field flows out without affecting the first sensor 500 disposed inside the first collector 810. Thus, the sensing device according to the embodiment has an advantage in that an effect of the external magnetic field on the first sensor 500 is small even in the y'-axis direction.

FIG. 26 is a view illustrating the housing 700 and the collector 800, FIG. 27 is a view illustrating the housing 700, FIG. 28 is a view illustrating a first protrusion 730, and FIG. 29 is a view illustrating a fusing process of the first protrusion 730.

Referring to FIGS. 26 and 27, the collector 800 is mounted to the housing 700.

The housing 700 may include a housing body 710, the first protrusion 730, and a second protrusion 720. The housing body 710 has a plate shape including an upper surface and a lower surface, and may have a shape of which upper and lower portions are open. A hole 701 is disposed at a central portion of the housing body 710. The stator holder 110 is positioned inside the hole 701. The circuit board 600 may be mounted on the lower surface of the housing body 710. The first sensor 500 is mounted on the circuit board 600. The first sensor 500 may be disposed on the upper surface of the housing 700 through a hole 740 of the housing 700. A separate cover may be coupled to a lower side of the housing body 710 to cover the circuit board 600. In addition, the housing 700 may include a groove 750 into which the protruding parts 814 and 824 of the collector 800 are inserted.

The second protrusion 720 may protrude from the upper surface of the housing 700 in the axial direction. The second protrusion 720 may be disposed along a circumference of the hole 701. The second protrusion 720 may be an arc-shaped member. The second protrusion 720 may be disposed between the first collector 810 and the second collector 820 in the radial direction. An outer circumferential surface of the second protrusion 720 may be in contact with an inner circumferential surface of the first collector 810, and an inner circumferential surface of the second protrusion 720 may be in contact with an outer circumferential surface of the second collector 820.

The first protrusion 730 may be disposed to protrude from an upper surface of the second protrusion 720 in the axial direction. In addition, the first protrusion 730 may be disposed between the first collector 810 and the second collector 820 in the radial direction. In addition, the first protrusion 730 may include a plurality of first protrusions 730. The first protrusion 730 is for fixing the collector 800 to the housing 700.

The first protrusion 730 may include a body 731, a head 732, and a first groove 732-3. The body 731 may protrude from the upper surface of the second protrusion 720 in the axial direction. The body 731 may be disposed between the first collector 810 and the second collector 820 in the radial direction. The head 732 is disposed at an upper end of the body 731. The head 732 may be divided into a first extending part 732a and a second extending part 732b. The first extending part 732a and the second extending part 732b may be disposed with the first groove 732-3 therebetween in the radial direction, and may be disposed to protrude from an upper surface of the body 731 in the axial direction.

An upper end of the first extending part 732a may be bent outward and may come into contact with an upper end 811a of the first collector 810. An upper end of the second extending part 732b may be bent inward and may come into contact with an upper end 821a of the second collector 820. The first extending part 732a and the second extending part 732b may include a first surface 732-1 and a second surface 732-2, respectively. The first surface 732-1 and the second surface 732-2 may be disposed to face each other. The first surface 732-1 is in contact with both an upper end 811a of the first collector 810 and the upper end 821a of the second collector 820. The second surface 732-2 may correspond to each of the upper end of the first extending part 732a and the upper end of the second extending part 732b.

The first groove 732-3 is concavely disposed on the second surface 732-2. A portion of the first groove 732-3 may be disposed to form a region O overlapping the first collector 810 and the second collector 820 in the radial direction. This is to prevent a deformed portion of the head 732, which is pushed out after being pressed in a fusing process of the head 732, from being pushed out toward the first collector 810 and the second collector 820 and to guide to be pushed into the space formed by the first groove 732-3 by sufficiently securing a space of the first groove 732-3 in the axial direction.

The first groove 732-3 may include a region having widths W1 and W2 in the radial direction which are different along the axial direction. This is caused by a shape formed while the deformed portion of the head 732, which is pushed out after being pressed in the fusing process of the head 732, is pushed into the first groove 732-3.

Referring to FIG. 29, such a shape of the first protrusion 730 may be formed through a fusing process acting in the axial direction. When the fusion is in progress in the axial direction, the upper ends of the head 732 protruding above the upper end 811a of the first collector 810 and the upper end 821a of the second collector 820 are deformed, and some deformed portions are pushed to the upper end 811a of the first collector 810 and the upper end 821a of the second collector 820. At the same time, another deformed portion of the head 732 is pushed toward the first groove 732-3. Since a substantial portion of the deformed portion of the head 732 is pushed toward the first groove 732-3, during the fusing process, a force pushing the first collector 810 outward and a force pushing the second collector 820 inward are greatly reduced.

After the fusing process, the first surface 732-1 in contact with the upper end 811a of the first collector 810 and the upper end 821a of the second collector 820 may be disposed on a plane perpendicular to the axial direction.

FIG. 30 is a view illustrating the collector in which a second groove and a third groove are disposed.

Referring to FIG. 30, the first collector 810 may include a second groove 812. The second groove 812 may be concavely disposed at an upper end of the first collector 810, and may include a plurality of second grooves 812. The second collector 820 may include a third groove 822. The third groove 822 may be concavely disposed at an upper end of the second collector 820, and may include a plurality of third grooves 822.

The second groove 812 and the third groove 822 are for increasing a coupling force between the housing 700 and the collector 800. The second groove 812 may include both side surfaces 812b and 812c and a bottom surface 812a, and the third groove 822 may include both side surfaces 822b and 822c and a bottom surface 822a. The both side surfaces 812b, 812c, 822b, and 822c may have different inclination directions. The bottom surface 812a connects the both side surfaces 812b and 812c, and the bottom surface 822a connects the both side surfaces 822b and 822c. When the collector 800 is viewed in the radial direction, the second groove 812 and the third groove 822 form a trapezoidal-shaped groove.

The second groove 812 and the third groove 822 are disposed to correspond to each other in the circumferential direction. The first protrusion 730 is disposed between the second groove 812 and the third groove 822 in the radial direction.

FIG. 31 is a view illustrating a third protrusion 732aa disposed in the second groove 812 of the first collector 810, FIG. 32 is a view illustrating a fourth protrusion 732bb disposed in the third groove 822 of the second collector 820, and FIG. 33 is a view illustrating a portion of the first collector 810 and a portion of the second collector 820 which are fixed to the housing by the first protrusion 730.

Referring to FIG. 31, a portion of the first extending part 732a, which is deformed during the fusing process, is filled in a space formed by the second groove 812 to form the third protrusion 732aa. In addition, referring to FIG. 32, a portion of the second extending part 732b deformed during the fusing process is filled in a space formed by the third groove 822 to form the fourth protrusion 732bb.

Referring to FIGS. 31 to 33, the second groove 812, the third groove 822, the third protrusion 732aa, and the fourth protrusion 732*bb* serve to increase a coupling force between the collector 800 and the first protrusion 730 by implementing a structure that increases a fusion area between the collector 800 and the first protrusion 730 and in which the collector 800 and the first protrusion 730 bite each other.

FIG. 34 is a view illustrating the collector 800 divided into a first region K1 and a second region K2.

Referring to FIG. 34, the collector 800 may be divided into the first region K1 and the second region K2 based on the circumferential direction with respect to the center C of the stator. The first region K1 and the second region K2 are divided based on a distance between the first collector 810 and the second collector 820 in the radial direction. A distance d2 between the first collector 810 and the second collector 820 in the radial direction in the first region K1 is less than a distance d1 between the first collector 810 and the second collector 820 in the radial direction in the second region K2.

A first protrusion 760 and the first sensor 500 are disposed together to correspond to the first region K1.

FIG. 35 is a view illustrating the first protrusion 760 and the first sensor 500 disposed between the first collector 810 and the second collector 820.

Referring to FIG. 35, the first protrusion 760 may be disposed in the radial direction between the bodies 812 and 813 of the first collector 810 and the bodies 822 and 823 of the second collector 820. In addition, the first protrusion 760 may be in contact with inner surfaces of the bodies 812 and 813 of the first collector 810 and outer surfaces of the bodies 822 and 823 of the second collector 820. The first protrusion 760 is interposed between the bodies 812 and 813 of the first collector 810 and the bodies 822 and 823 of the second collector 820 where the first sensor 500 is positioned, so that a gap between the first collector 810 and the second collector 820 in the radial direction is physically secured.

The first protrusion 760 may be a cylindrical member or may include a curved surface. Accordingly, the first protrusion 760 may be in line contact with the bodies 812 and 813 of the first collector 810 along the axial direction. In addition, the first protrusion 760 may be in line contact with the bodies 822 and 823 of the second collector 820 along the axial direction. This provides an advantage of not being caught by the first protrusion 760 when the first collector 810 and the second collector 820 are mounted to the housing with the first protrusion 760 therebetween.

A width w1 of the first protrusion 760 in the radial direction may be greater than or equal to a width w2 of the first sensor 500 in the radial direction. The width w1 of the first protrusion 760 in the radial direction may be less than a width w3 of the second protrusion 720 in the radial direction.

The first protrusion 760 may include a first-first protrusion 761 and a first-second protrusion 762. In the collector 800, the first bodies 812 and 822 are disposed adjacent to each other in the circumferential direction and the second bodies 813 and 823 are disposed adjacent to each other in the circumferential direction. The first sensor 500 is disposed on each of the first and second bodies 812 and 813 and the first and second bodies 822 and 823. The first-first protrusion 761 may be disposed on one side of the first sensor 500, and the first-second protrusion 762 may be disposed on the other side of the first sensor 500. In addition, the first-first protrusion 761 and the first-second protrusion 762 may be disposed to be symmetrical with respect to a reference line T passing through the center C of the stator and a center of a width of the bodies 812, 813, 822, and 823 in the circumferential direction.

When the gap between the first collector 810 and the first collector 820 is changed in the vicinity of the bodies 812 and 813 of the first collector 810 and the bodies 822 and 823 of the second collector 820, the amount of magnetic flux detected by the first sensor 500 is greatly affected by such a change. The first protrusion 760 effectively secures the performance of the sensing device by securing the gap between the bodies 812 and 813 of the first collector 810 and the bodies 822 and 823 of the second collector 820 at a position corresponding to the first sensor 500.

FIG. 36 is a view illustrating the housing in which a first groove and a second groove are disposed.

Referring to FIG. 36, the housing 700 may include a first groove 750 and a second groove 770. The first groove 750 is formed to be concave in the axial direction, and the protruding parts 814 and 824 of the collector 800 are inserted into the first groove 750. Since the protruding parts 814 and 824 are inserted into the first groove 750, the collector 800 is firmly fixed to the housing 700 without moving.

The first groove 750 may include a first-first groove 751 and a first-second groove 752. The first-first groove 751 may be disposed on an outer side of the second protrusion 720. The first-second groove 752 may be disposed on an inner side of the second protrusion 720. The protruding parts 814 and 824 of the first collector 810 are inserted into the first-first groove 751. The protruding parts 814 and 824 of the second collector 820 are inserted into the first-second groove 752.

The second groove 770 guides the protruding parts 814 and 824 to be easily inserted into the first groove 750. The second groove 770 may be formed to be concave in the radial direction in an inner surface of the second protrusion 720. Alternatively, the second groove 770 may be formed to be concave in the radial direction on an outer surface of the second protrusion 720. A plurality of second grooves 770 may be disposed.

Meanwhile, the first groove 750 and the second groove 770 may be disposed to face the hole 740, through which the first sensor 500 passes, based on the center C of the stator. When the gap between the first collector 810 and the second collector 820 is changed at a point opposite to the first sensor 500 with respect to the center C of the stator, the amount of magnetic flux sensed by the first sensor 500 is greater affected by such a change than other regions of the collector 800.

Accordingly, the first groove 750 and the second groove 770 are disposed to face the hole 740, through which the first sensor 500 passes, with respect to the center C of the stator in order to allow the first groove 750 to be disposed at a point opposite to the first sensor 500 with respect to the center C of the stator so that the first collector 810 and the second collector 820 are prevented from being deformed or moved at the corresponding point, thereby effectively securing the performance of the sensing device. For the same reason, the protruding parts 814 and 824 of the collector 800 are positioned on opposite sides of the bodies 812, 813, 822, and 823 of the collector 800.

FIG. 37 is a view illustrating a first gear and a second gear that are engaged with a main gear.

Referring to FIG. 37, a first gear 1000 and a second gear 1100, which are engaged with a main gear 121*a* as sub-gears, are included. The main gear 121*a*, the first gear 1000, the second gear 1100, and a second sensor 610 are for measuring an angle of the steering shaft.

The main gear 121*a* is engaged with the first gear 1000 and the second gear 1100 to rotate. The main gear 121*a* is disposed on the outer circumferential surface of the stator body 120. The first gear 1000 and the second gear 1100 are rotatably disposed on the housing body 710. Gear ratios between the main gear 121*a*, the first gear 1000, and the second gear 1100 are predetermined. For example, in a case in which a total angle of the main gear 121*a* is 1620°, the first gear 1000 may be designed to rotate 15.6 times and the second gear 1100 may be designed to rotate 14.625 times when the main gear 121*a* rotates 4.5 times. Here, the total angle is an angle calculated by accumulating rotation of the main gear 121*a* when all the gears return to a state before rotating.

Magnets may be disposed on the first gear 1000 and the second gear 1100. The magnets are disposed to face the second sensor 610

FIG. 38 is a view illustrating a directionality of an external magnetic field with respect to the stator teeth 130 and 140, and FIG. 39 is a view illustrating a state in which the first sensor 500 avoids an external magnetic field having a z-axis directionality.

Referring to FIG. 38, an external magnetic field greatly affects the sensing device in a z-axis direction, which is the axial direction, and the y'-axis direction perpendicular to the z-axis direction.

Referring to FIG. 39, the first sensor 500 of the sensing device according the embodiment is disposed in a state in which the first sensor 500 stands in the z-axis direction. Accordingly, an area of the first sensor 500 when viewed in the z-axis direction is much less than an area of the first sensor 500 when viewed in the y'-axis direction. Accordingly, the sensing device according to the embodiment has an advantage in that an effect of the external magnetic field on the first sensor 500 is small in the z-axis direction.

Referring to FIGS. 25 and 39, when the state in which the first sensor 500 stands in the z-axis direction is considered, a circumferential magnetic field in the y'-axis direction may greatly affect the first sensor 500. However, since the circumferential magnetic field in the y'-axis direction is induced along the first stator tooth 130 and the second stator tooth 140, the circumferential magnetic field flows out without affecting the first sensor 500. Accordingly, the sensing device according to the embodiment has an advantage in that an effect of the external magnetic field on the first sensor 500 is also small even in the y'-axis direction.

FIG. 40 is a graph illustrating a comparison of an amount of change in angle with respect to an external magnetic field in the z-axis direction between Comparative Example and Example.

Referring to FIG. 40, in the case of Comparative Example, the sensing device has a structure in which the stator teeth 130 and 140 are vertically disposed and the first sensor 500 is laid down, and it can be seen that, as an external magnetic field in a z-axis direction increases, an amount of change in angle increases linearly, and thus the measured angle is greatly changed according to the external magnetic field.

On the other hand, in the case of Example, it can be seen that, even when an external magnetic field in a z-axis direction increases, a change in angle barely occurs, and thus the angle is barely affected by the external magnetic field.

FIG. 41 is a graph illustrating a comparison of an amount of change in angle with respect to the external magnetic field in the y'-axis direction between Comparative Example and Example.

Referring to FIG. 41, in the case of Comparative Example, the sensing device has the structure in which the first and second stator teeth 130 and 140 are vertically disposed and the sensor is laid down, and it can be seen that, as an external magnetic field in the y'-axis direction increases, an amount of change in angle increases linearly, and thus the measured angle is greatly changed according to the external magnetic field.

On the other hand, in the case of Example, it can be seen that, even when an external magnetic field in the y'-axis direction increases, a change in angle barely occurs, and thus the angle is barely affected by the external magnetic field.

The invention claimed is:

1. A sensing device for a motor comprising:
a stator including a stator tooth; and
a rotor including a magnet,
wherein the stator tooth includes a first stator tooth and a second stator tooth disposed inside the first stator tooth,
wherein the first stator tooth includes a plurality of first teeth, and the second stator tooth includes a plurality of second teeth,
wherein the first tooth overlaps the second tooth in a radial direction from a center of the stator,
the motor further comprises:
a sensor and a collector disposed between the first stator tooth and the second stator tooth in the radial direction;
a circuit board on which the sensor is disposed; and
a housing configured to accommodate the circuit board,
wherein the collector includes a first collector and a second collector disposed inside the first collector,
the sensor is disposed between the first collector and the second collector in the radial direction, and
the housing includes a first protrusion,
wherein the first protrusion includes a body disposed between the first collector and the second collector in the radial direction, a head disposed on an upper end of the body, and a first groove,
wherein the head includes a first surface and a second surface disposed to face each other,
wherein the first surface is in contact with an upper end of the first collector and an upper end of the second collector, and
the first groove is concavely disposed on the second surface, and a portion of the first groove is disposed to overlap the first collector and the second collector in the radial direction.

2. The sensing device for a motor of claim 1, wherein the first collector includes a second groove concavely disposed at an upper end thereof,
the second collector includes a third groove concavely disposed at an upper end thereof, and
the head includes a second protrusion disposed in the second groove and a third protrusion disposed in the third groove.

3. The sensing device for a motor of claim 2, wherein the second groove and the third groove are disposed to correspond to each other in a circumferential direction with respect to the center of the stator.

4. A sensing device for a motor comprising:
a stator including a stator tooth; and
a rotor including a magnet,
wherein the stator tooth includes a first stator tooth and a second stator tooth disposed inside the first stator tooth,
wherein the first stator tooth includes a plurality of first teeth, and the second stator tooth includes a plurality of second teeth,
wherein the first tooth overlaps the second tooth in a radial direction from a center of the stator,
the motor further comprises:

a sensor and a collector disposed between the first stator tooth and the second stator tooth in the radial direction;
a circuit board on which the sensor is disposed; and
a housing configured to accommodate the circuit board,
wherein the collector includes a first collector and a second collector disposed inside the first collector,
the sensor is disposed between the first collector and the second collector in the radial direction, and
the housing includes a first protrusion,
wherein the first protrusion includes a body disposed between the first collector and the second collector in the radial direction, and a first extending part and a second extending part that extend from the body,
wherein the first extending part and the second extending part are disposed to be spaced apart from each other in the radial direction,
a portion of the first extending part is in contact with an upper surface of the first collector, and
a portion of the second extending part is in contact with an upper surface of the second collector.

5. The sensing device for a motor of claim 4, wherein the first collector includes a second groove concavely disposed at an upper end thereof,
the second collector includes a third groove concavely disposed at an upper end thereof,
the first extending part includes a third protrusion disposed in the second groove, and
the second extending part includes a fourth protrusion disposed in the third groove.

6. A sensing device for a motor comprising:
a stator including a stator tooth; and
a rotor including a magnet,
wherein the stator tooth includes a first stator tooth and a second stator tooth disposed inside the first stator tooth,
wherein the first stator tooth includes a plurality of first teeth, and the second stator tooth includes a plurality of second teeth,
wherein the first tooth overlaps the second tooth in a radial direction from a center of the stator,
the motor further comprises:
a first sensor and a collector disposed between the first stator tooth and the second stator tooth in the radial direction;
a circuit board on which the sensor is disposed; and
a housing configured to accommodate the circuit board,
wherein the collector includes a first collector and a second collector disposed inside the first collector,
the first sensor is disposed between the first collector and the second collector in the radial direction, and
each of the first collector and the second collector includes a body that is disposed to face the first sensor, and
the housing includes a first protrusion,
wherein the first protrusion is disposed between the body of the first collector and the body of the second collector in the radial direction and is in contact with an inner surface of the body of the first collector and an outer surface of the body of the second collector.

7. The sensing device for a motor of claim 6, wherein the first protrusion includes a first-first protrusion and a first-second protrusion,
wherein the first-first protrusion is disposed on one side of the first sensor in a circumferential direction, and
the first-second protrusion is disposed on the other side of the first sensor in the circumferential direction.

8. The sensing device for a motor of claim 6, wherein the housing includes a second protrusion disposed between the first collector and the second collector in the radial direction, and
the first protrusion is disposed to protrude from the second protrusion.

9. A sensing device for a motor comprising:
a stator including a stator tooth; and
a rotor including a magnet,
wherein the stator tooth includes a first stator tooth and a second stator tooth disposed inside the first stator tooth,
wherein the first stator tooth includes a plurality of first teeth, and the second stator tooth includes a plurality of second teeth,
wherein the first tooth overlaps the second tooth in a radial direction from a center of the stator,
the motor further comprises:
a first sensor and a collector disposed between the first stator tooth and the second stator tooth in the radial direction;
a circuit board on which the sensor is disposed; and
a housing configured to accommodate the circuit board,
wherein the collector includes a first collector and a second collector disposed inside the first collector, and
the collector is divided into a first region and a second region having different distances between the first collector and the second collector in the radial direction, and
the housing includes a first protrusion,
wherein the first protrusion and the sensor are disposed between the first collector and the second collector in the radial direction and disposed together to correspond to one of the first region and the second region.

10. The sensing device for a motor of claim 9, wherein a distance between the first collector and the second collector in the radial direction in the first region is less than a distance between the first collector and the second collector in the radial direction in the second region,
the first protrusion and the first sensor are disposed in the first region, and
the first protrusion is in contact with the first collector and the second collector in the first region.

* * * * *